US009591272B2

United States Patent
Shirani et al.

(10) Patent No.: US 9,591,272 B2
(45) Date of Patent: Mar. 7, 2017

(54) OPTIMAL CAMERA SELECTION IN ARRAY OF MONITORING CAMERAS

(71) Applicant: McMaster University, Hamilton (CA)

(72) Inventors: Shahram Shirani, Oakville (CA); Shadrokh Samavi, Isfahan (IR); Sayedmohammadreza Soroushmehr, Hamilton (CA); Hamed Sadeghi, Toronto (CA)

(73) Assignee: McMASTER UNIVERSITY, Hamilton, CA (US)

( * ) Notice: Subject to any disclaimer, the term of this patent is extended or adjusted under 35 U.S.C. 154(b) by 234 days.

(21) Appl. No.: 14/115,093

(22) PCT Filed: Mar. 28, 2013

(86) PCT No.: PCT/CA2013/050260
§ 371 (c)(1),
(2) Date: Oct. 31, 2013

(87) PCT Pub. No.: WO2013/149340
PCT Pub. Date: Oct. 10, 2013

(65) Prior Publication Data
US 2014/0055621 A1 Feb. 27, 2014

Related U.S. Application Data

(60) Provisional application No. 61/618,925, filed on Apr. 2, 2012.

(51) Int. Cl.
*H04N 7/18* (2006.01)
*H04N 5/247* (2006.01)
*G08B 13/196* (2006.01)

(52) U.S. Cl.
CPC ....... *H04N 7/181* (2013.01); *G08B 13/19641* (2013.01); *H04N 5/247* (2013.01); *H04N 7/18* (2013.01)

(58) Field of Classification Search
CPC ............... H04N 7/181; H04N 13/0242; H04N 13/0468; H04N 21/21805; H04N 13/0239; G06K 2009/3225
(Continued)

(56) References Cited

U.S. PATENT DOCUMENTS 6,741,250 B1 5/2004 Furlan et al.
6,954,224 B1 10/2005 Okada et al.
(Continued)

FOREIGN PATENT DOCUMENTS

EP 2328131 A2 6/2011
JP 201054203 A 3/2010
(Continued)

OTHER PUBLICATIONS

J. Zhao and S.S. Cheung, "Multi-Camera Surveillance with Visual Tagging and Generic Camera Placement", First ACM/IEEE International Conference on Distributed Smart Cameras, 2007.*
(Continued)

*Primary Examiner* — Gims Philippe
*Assistant Examiner* — Ayman Abaza
(74) *Attorney, Agent, or Firm* — Turk IP Law, LLC

(57) ABSTRACT

Technologies are generally described for automatically optimizing an efficiency of camera placement, numbers, and resolution in multi-camera monitoring and surveillance applications. In some examples, a fraction of a total area may be monitored at a higher resolution than the rest. Employing techniques such as combinatorial state Viterbi technique or combinatorial state trellis technique, a minimum number of cameras that provide the coverage at the needed resolution may be selected. Similarly, a number of points may be covered with at least a predefined number of cameras. For example, a subject of interest may be tracked in a public area, where specific camera(s) may be used to
(Continued)

image the subject's face at a higher resolution than the background.

12 Claims, 12 Drawing Sheets

(58) Field of Classification Search
 USPC .......................................................... 348/159
 See application file for complete search history.

(56) References Cited

U.S. PATENT DOCUMENTS

| | | | |
|---|---|---|---|
| 7,187,402 | B2 | 3/2007 | Yonezawa et al. |
| 7,440,594 | B2 | 10/2008 | Takenaka |
| 7,668,345 | B2 | 2/2010 | Kiyohara et al. |
| 2005/0065802 | A1 | 3/2005 | Rui et al. |
| 2005/0225638 | A1 | 10/2005 | Tanaka et al. |
| 2006/0222209 | A1 | 10/2006 | Zhang et al. |
| 2007/0039030 | A1 | 2/2007 | Romanowich et al. |
| 2009/0040367 | A1 | 2/2009 | Zakrzewski et al. |
| 2012/0038776 | A1 | 2/2012 | Ahiska et al. |
| 2012/0307067 | A1* | 12/2012 | Chen ...................... H04N 7/181 348/159 |

FOREIGN PATENT DOCUMENTS

| | | |
|---|---|---|
| WO | 03030550 A1 | 4/2003 |
| WO | 2006132029 A1 | 12/2006 |

OTHER PUBLICATIONS

J. Zhao and S.S. Cheung, "Multi-Camera Surveillance with Visual Tagging and Generic Camera Placement", 1st ACM/IEEE International Conference on Distributed Smart Cameras, 2007.*
S. Indu, S. Chaudhury, N.R. Mittal and A. Bhattacharyya, "Optimal Sensor Placement for Surveillance of Large Spaces", Third International Conference on Digital Object Identifier, 2009.*
Yifan Zhou, Jenny Benois-Pineau, Henri Nicolas, "A multi-resolution particle filter tracking with a dual consistency check for model update in a multi-camera environment", 11th International Workshop on Image Analysis for Multimedia Interactive Services WIAMIS, 2010.*
Youn-Hee Han, Chan-Myung Kim and Joon-Min Gil, "A Greedy Algorithm for Target Coverage Scheduling in Directional Sensor Networks", 5th International Conference on Ubiquitous Information Technologies and Applications (CUTE), 2010.*
"Object Tracking & Understanding," Mitsubishi Electric Research Laboratories, accessed at http://web.archive.org/web/20081120032302/http://www.merl.com/projects/ObjectTracking/, Modified on Jul. 15, 2004, p. 1-1.
Arulampalam. M.S., et al., "A Tutorial on Particle Filters for Online Nonlinear/Nun-Gaussian Bayesian Tracking," IEEE Transactions on Signal Processing, vol. 50, Issue 2, pp. 174-188 (Feb. 2002).
Comaniciu, D., et al "Kernel-Based Object Tracking" IEEE Transactions on Pattern Analysis and Machine Intelligence, vol. 25, Issue 5, pp. 564-577 (May 2003).
Krahnstoever, N., et al., "Collaborative Real-Time Control of Active Cameras in Large Scale Surveillance Systems," M2SFA2 2008: Workshop on Multi-camera and Multi-modal Sensor Fusion, pp. 12 (Oct. 13, 2008).
Micheloni, C., et al., "A network of co-operative cameras for visual surveillance," IEE Proceedings Vision, Image and Signal Processing, , vol. 152, Issue 2, pp. 205-212 (Apr. 8, 2005).
Viola, and Jones, M., "Rapid Object Detection Using a Boosted Cascade of Simple Features," Mitsubishi Electric Research Laboratories, pp. 13 (May 2004).
Akyildiz et al., "A survey on wireless multimedia sensor networks", Computer Networks, vol. 51, No. 4, pp. 921-960, Published on Oct. 5, 2007.

Arampatzis et al., "A survey of applications of wireless sensors and wireless sensor networks," Intelligent Control, 2005. Proceedings of the 2005 IEEE International Symposium on, Mediterranean Conference on Control and Automation, Date of Conference: Jun. 27-29, 2005.
Cai et al., "Target-oriented scheduling in directional sensor networks," in INFOCOM 2007. 26th IEEE International Conference, Date of Conference: May 6-12, 2007.
Charfi et al., "Challenging issues in visual sensor networks," Wireless Communications, IEEE, vol. 16, No. 2, pp. 44-49, Published on Apr. 2009.
Cheng et al., "Distributed barrier coverage in wireless visual sensor networks with B-QoM," Sensors Journal, IEEE, vol. 12, No. 6, pp. 1726-1735, Jun. 2011.
Dieber et al., "Resource-aware coverage and task assignment in visual sensor networks," Circuits and Systems for video Technology, IEEE Transactions on, vol. 21, No. 10, pp. 1424-1437, Published on Oct. 2011.
Fusco et al., "Selection and orientation of directional sensors for coverage maximization," in Sensor Mesh and Ad Hoc Communications and Networks, 2009. SECON "09. 6th Annual IEEE Communications Society Conference on Jun. 2009.
Guvensan et a.l, "On coverage issues in directional sensor networks: A survey," Ad Hoc Networks, vol. 9, No. 7, pp. 1238-1255, Published on Sep. 2011.
Huang et al., "The coverage problem in a wireless sensor network," in Proceedings of the 2nd ACM international conference on Wireless sensor networks and applications, ser. WSNA '03. New York, NY, Published on Sep. 19, 2003.
Kandoth et al., "Angular mobility assisted coverage in directional sensor networks," in Network Based Information Systems, 2009. NBIS 2009, Aug. 2009.
Lobaton et al "A distributed topological camera network representation for tracking applications," Image Processing, IEEE Transactions on, vol. 19, No. 10, pp. 2516-2529, Oct. 2010.
Lobaton et al., "Algebraic approach to recovering topological information in distributed camera networks," in Information Processing in Sensor Networks, 2009. IPSN 2009, Apr. 2009.
Ma et al., "A coverage-enhancing method for 3D directional sensor networks," in INFOCOM 2009, IEEE,, pp. 2791-2795, Published on Apr. 2009.
Park et al., "A look-up table based approach for solving the camera selection problem in large camera networks," in in Proceedings of the International Workshop on Distributed Smart Cameras, Oct. 2006.
Rekleitis et al., "Simultaneous planning localization, and mapping in a camera sensor network," Robotics and Autonomous Systems (RAS) Journal, special, vol. 54, pp. 921-932, 2006, Aug. 2006.
Shen et al., "A multi-camera surveillance system that estimates quality-of-view measurement," in Image Processing, 2007. ICIP 2007. IEEE International Conference, Oct. 2007.
Soro et al., "Camera selection in visual sensor networks", In Advanced video and Signal Based Surveillance, 2007. AVSS 2007. IEEE, Sep. 2007.
Tseng et al., "k-Angle Object Coverage Problem in a Wireless Sensor Network," Sensors Journal, IEEE, vol. PP, No. 99, p. 1, Dec. 2012.
Viterbi et al., "Error Bounds for Convolutional Codes and an Asymptotically Optimum Decoding Algorithm," Information Theory, IEEE Transactions on, 13, No. 2, pp. 260-269, Apr. 1967.
Wang et al., "Priority-based target coverage in directional sensor networks using a genetic algorithm," Computers and Mathematics with Applications, vol. 57,No. 11-12, pp. 1915-1922, Jun. 2009.
Wolf et al., "Finding the Best Set of K Paths Through a Trellis With Application to Multitarget Tracking", IEEE Transactions on Aerospace and Electronic Systems, vol. 25, Issue 2, pp. 287-295, ISSN#OO I 8-9251, Digital Object Identifier I 0-1 I 0917.18692; (Wolf et al.), published on Mar. 19, 1989.
Wu, et al., "Efficient algorithms for probabilistic k-coverage in directional sensor networks," in Intelligent Sensors, Sensor Networks and Information Processing, 2008. ISSNIP 2008, Dec. 2008.

(56) References Cited

OTHER PUBLICATIONS

Yang et al., "Coverage quality based target-oriented scheduling in directional sensor networks," in Communications (ICC), 2010 IEEE International Conference on May 2010.
International Search Report and Written Opinion for PCT/CA2013/050260 filed Mar. 28, 2013, mailed Jul. 22, 2013.
Aghdasi et al., "High-Resolution Images with Minimum Energy Dissipation and Maximum Field-of-view in Camera-Based Wireless Multimedia Sensor Networks", Sensors, Aug. 19, 2009.
Soro et al., "A Survey of Visual Sensor Networks", Advances in Multimedia, Accepted May 13, 2009.
Mavrinac et al., "Task-Oriented Optimal View Selection in a Calibrated Multi-Camera System", Advanced Intelligent Mechatronics (AIM), pp. 69-74, Jul. 2012.
Kim et al., "Image Quality and Lifetime Co-optimization in Wireless Multi-Camera Systems", Circuits and Systems (ISCAS), pp. 2641,2644, May 2011.

\* cited by examiner

US 9,591,272 B2

OPTIMAL CAMERA SELECTION IN ARRAY OF MONITORING CAMERAS

CROSS-REFERENCE TO RELATED APPLICATIONS

This Application is the U.S. National Stage filing under 35 U.S.C §371 of PCT Application Serial No. PCT/CA2013/050260 filed on Mar. 28, 2013, which claims the benefit under 35 U.S.C §365 (c) of U.S. Provisional Application 61/618,925 filed on Apr. 2, 2012. The disclosures of the PCT Application and Provisional Application are hereby incorporated by reference in their entireties.

BACKGROUND

This application claims priority to U.S. Provisional Application Ser. No. 61/618,925 filed on Apr. 2, 2012. The provisional application is hereby incorporated by reference in its entirety.

Unless otherwise indicated herein, the materials described in this section are not prior art to the claims in this application and are not admitted to be prior art by inclusion in this section.

In video surveillance applications such as those in subway stations, stores, and airports, areas of importance may need coverage by a network of camera sensors. In some applications higher resolution images (zooms) may be needed for specific areas. For example, if a subject is being tacked in a subway station, higher resolution on the face may be needed as opposed to images of the subject's body so the subject can be adequately identified. Higher resolutions may be obtained by setting specific cameras on higher resolutions. Use of high resolution cameras for all applications may not only result in prohibitively high cost, but also increase load on system resources such as bandwidth, storage capacity, and comparable resources.

In systems where a select number of cameras are high resolution, a surveillance operator may be able select suitable cameras and resolutions for an area such that the number of cameras and the error between the assigned and desired resolutions are minimized simultaneously. However, if the number of cameras or the area to be covered is large, the task may become too complicated to be resolved manually.

SUMMARY

The present disclosure generally describes methods, apparatus, systems, devices, and/or computer program products related to automatically optimizing the efficiency of camera placement, numbers, and resolution for a multi-camera monitoring and surveillance application.

According to some examples, methods for automatically optimizing an efficiency of camera placement, numbers, and resolution in a multi-camera monitoring environment are described. Example methods may include determining a maximum resolution matrix, V, where each element, $v_{i,j}$, of the V represents a maximum resolution with which a camera $c_i$ is capable to monitor a point $p_j$ in the multi-camera environment; receiving a desired resolution vector, $Res_{des}$, where each element of the $Res_{des}$ represents a desired resolution for each point; and evaluating the elements of the V in view of the $Res_{des}$ to determine an optimal camera and resolution selection taking into consideration a cost function, where the cost function includes at least an error in a resolution assigned to each point.

According to other examples, a computing device operable to automatically optimize an efficiency of camera placement, numbers, and resolution in a multi-camera monitoring environment is described. The computing device may include a memory configured to store instructions; an input device configured to receive a desired resolution vector, $Res_{des}$, where each element of the $Res_{des}$ represents a desired resolution for each point in the multi-camera environment; and a processor. The processor may be configured to determine a maximum resolution matrix, V, where each element, $v_{i,j}$, of the V represents a maximum resolution with which a camera $c_i$ is capable to monitor a point $p_j$ in the multi-camera environment; and evaluate the elements of the V in view of the $Res_{des}$ to determine an optimal camera and resolution selection taking into consideration a cost function, where the cost function includes at least an error in a resolution assigned to each point.

According to further examples, a method for optimal camera selection in array of cameras for monitoring and surveillance applications is described. An example method may include determining a plurality of resolutions associated with a plurality of cameras defined for intervals along a linear axis; receiving information associated with points on the intervals and desired resolutions for the points; forming a combinatorial state trellis, where each level represents a point according to a linear order of the points and possible combinations of camera resolutions covering the point are listed as states on a corresponding level; and evaluating optimal paths through the levels while obeying resolution constraints in each path that is traversed in the trellis until a survival path is determined.

According to further examples, a computing device for optimal camera selection in array of cameras for monitoring and surveillance applications is described. The computing device may include a memory configured to store instructions and a processor. The processor may be configured to determine a plurality of resolutions associated with a plurality of cameras defined for intervals along a linear axis; receive information associated with points on the intervals and desired resolutions for the points; form a combinatorial state trellis, where each level represents a point according to a linear order of the points and possible combinations of camera resolutions covering the point are listed as states on a corresponding level; and evaluate optimal paths through the levels while obeying resolution constraints in each path that is traversed in the trellis until a survival path is determined.

According to some examples, a method for optimal light subset selection in a lighting array that achieves a desired intensity for an area of illumination is provided. An example method may include determining a plurality of lighting intensities associated with a plurality of lights defined for intervals along a linear axis; receiving information associated with points on the intervals and desired lighting intensities for the points; forming a combinatorial state trellis, wherein each level represents a point according to a linear order of the points and possible combinations of lighting intensities covering the point are listed as states on a corresponding level; and evaluating optimal paths through the levels while obeying lighting intensity constraints in each path that is traversed in the trellis until a survival path is determined.

According to other examples, a computing device for optimal light subset selection in a lighting array that achieves a desired intensity for an area of illumination is described. The computing device may include a memory configured to store instructions and processor. The processor may be configured to determine a plurality of lighting intensities associated with a plurality of lights defined for intervals along a linear axis; receive information associated with points on the intervals and desired lighting intensities for the points; form a combinatorial state trellis, wherein each level represents a point according to a linear order of the points and possible combinations of lighting intensities covering the point are listed as states on a corresponding level; and evaluate optimal paths through the levels while obeying lighting intensity constraints in each path that is traversed in the trellis until a survival path is determined.

According to yet other examples, a computer readable storage medium with instructions stored thereon for executing the above methods at one or more processors for optimizing an efficiency of camera placement, numbers, and resolution in a multi-camera monitoring environment may also be described.

The foregoing summary is illustrative only and is not intended to be an any way limiting. In addition to the illustrative aspects, embodiments, and features described above, further aspects, embodiments, and features will become apparent by reference to the drawings and the following detailed description.

BRIEF DESCRIPTION OF THE DRAWINGS

The be foregoing and other features of this disclosure will become more fully apparent From the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
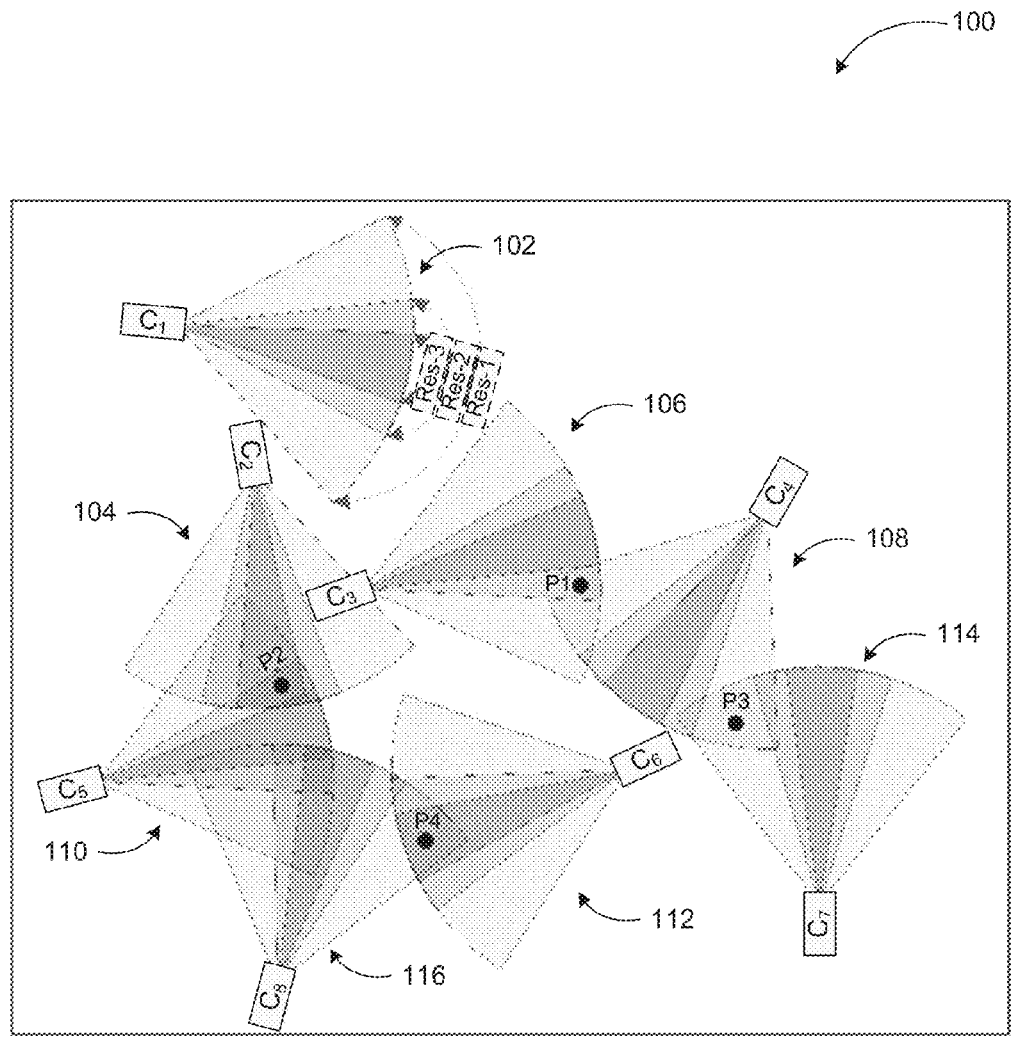
FIG. 1 illustrates an example two-dimensional system of a number of points and multi-resolution cameras.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to automatic optimization of efficiency of camera placement, numbers, and resolution for a multi-camera monitoring and surveillance application.

Briefly stated, technologies are generally provided for automatically optimizing an efficiency of camera placement, numbers, and resolution in multi-camera monitoring and surveillance applications. In some examples, a fraction of a total area may be monitored at a higher resolution than the rest. Employing techniques such as combinatorial state Viterbi technique or combinatorial state trellis technique, a minimum number of cameras that provide the coverage at the needed resolution may be selected. Similarly, a number of points may be covered with at least a predefined number of cameras. For example, a subject of interest may be tracked in a public area, where specific camera(s) may be used to image the subject's face at a higher resolution than the background.

FIG. 1 illustrates an example tow-dimensional system of a number of points and multi-resolutions cameras, arranged in accordance with at least some embodiments described herein.

Two-dimensional coverage in area surveillance typically assumes that the objects in the coverage area are seen at a single resolution. This may not always be the case, however, and multiple resolutions (for example, for facial recognition purposes) may be desirable. A system according to some examples treats coverage of two-dimensional surveillance with multiple resolution selection as an NP-complete configuration employs heuristic techniques to select cameras in an array of cameras for monitoring and surveillance applications. In some example scenarios, the two-dimensional configuration may be converted to an equivalent one-dimensional configuration without loss of optimality.

As shown in a diagram 100, monitoring/surveillance system according to some embodiments may include a number of cameras such as cameras C1 through C8. The cameras C1 through C8 may be positioned such that a number of points p1 through p4 are covered at specific resolutions, among other things. Each camera may have its coverage area such as a coverage area 102 for the camera C1, a coverage area 102 for the camera C1, a coverage area 104 for the camera C2, a coverage area 106 for the camera C3, a coverage area 108 for the camera C4, a coverage area 110 for the camera C5, a coverage area 112 for the camera C6, a coverage area 114 for the camera C7, and coverage area 116 for the camera C8.

One or more of the cameras in a system according to some examples may be settable to different resolutions, where each resolution may represent a level of zoom. Thus, higher resolution may provide a more magnified image. Typically, a higher resolution coverage area of a camera may be smaller than the coverage area for a lower resolution as depicted by the coverage areas for different resolutions (1 through 3) of the camera C1. The cameras may be configured to cover a number of points with specific resolutions. A number of points and a number of cameras are referred to as NoP and NoC, respectively, herein.

The assigned resolutions to cameras may be represented with a vector A, where each element Xi corresponds to a resolution of a camera i. A length of the vector X is, thus, NoC.

$$X = [X_1 X_2 \ldots X_{NoC}] \quad [1]$$

Assuming a maximum resolution value is $n_R$, each vector element may be considered as $$Xi \in \{0, 1, 2, \ldots, n_R\} \quad [2]$$

in a general case, where points and cameras may be distributed over a two-dimensional area at any location.

Each point may be desired to be covered with a specific resolution. Thus, the decision involves which cameras to turn on and what resolution to assign to each camera so that the desired resolution is approximately provided for all of the points. Hence, the number of "ON" cameras and an error in assigned resolution to each point may be minimized simultaneously. A system according to embodiments may model this configuration approach as a discrete optimization.

A matrix V, a maximum resolution matrix, may be defined first, V may be an NoC by NoP matrix, where each element of V, $v_{i,j}$, may represent the maximum resolution with which camera i can see point j. If it can be determined that a point can be covered by a camera with at most resolution k, the point may also be covered by the same camera with lower resolutions and cannot be seen with higher resolutions. Thus, the knowledge of the maximum resolution may include the information about other resolutions as well. The maximum resolution matrix, V, may be used to define one of the costs as discussed below.

One of the cost functions may include the error in the resolution assigned to each point. For example, for computing the cost for point j, the desired resolution of the point j, $Res_{desj}$, may be compared with the assigned resolution of the point j, $Res_{assj}$, which may be the maximum resolution among all cameras covering the point j. Equivalently the assigned resolution may be written as:

$$Res_{assj}(X) = \max(X_{cj}), \quad [3]$$

where $$C_j = \{i, X_i \leq V(i,j)\}. \quad [4]$$

Alternatively, following equation may be written using vector inequalities:

$$Res_{assj}(X) = \max(X(X \leq V(i,j))). \quad [5]$$

Elements of X which are less than or equal to their corresponding element in $j^{th}$ column of V may be considered and the maximum selected. If a resolution higher than the desired resolution is assigned to a point, the error in the resolution assignment may be considered to be zero. With the above listed definitions, the camera selection may be modeled as a discrete optimization. Thus, the number of "ON" cameras cost and the resolution error cost may be linearly combined with a parameter λ to determine a total cost. λ is a factor which determines an importance of one part of the cost function over another Part. Subsequently, the total cost may be minimized using:

$$\min_X C(X) \equiv \min_X \left( I_0(X) + \lambda \sum_{j=1}^{NoP} (0, Res_{desj} - Res_{assj}(X)) \right), \quad [6]$$

where the resolution cost is $$\text{Resolution cost} = \sum_{j=1}^{NoP} \max(0, Res_{desj} - Res_{assj}(X)). \quad [7]$$

Where $X = [X_1 X_2 \ldots X_{NoC}]$ and $I_o(X)$ provide the number of non-zero elements of vector X. The max function may be used to impose that if a higher resolution is assigned to a point, the resolution error is zero.

Changing λ may have a substantial effect on the solution. For example, if λ is selected large enough, the above described technique may tend to minimize the resolution cost approximately regardless of the first cost. If one cost is not preferred to another, both costs may be normalized to their maximum value and λ selected to be 1. If the number of cameras is less than the number of points, then the maximum value of $I_o(X)$ may be NoC. IF the number of cameras is not less than the number of points (i.e. NoP<NoC), the approach may be applied with NoP cameras with the maximum value of $I_o(X)$ being min(NoC, NoP) in this case. The maximum value of the resolution cost may be obtained when the assigned resolutions are zero:

$$\max(\text{Resolution cost}) = \sum_{j=1}^{NoP} Res_{desj}. \quad [8]$$

Next, a minimization may be performed:

$$\min_X \left( \frac{I_0(X)}{\min(NoC, NoP)} + \lambda \frac{\sum_{j=1}^{NoP} (0, Res_{desj} - Res_{assj}(X))}{\sum_{j=1}^{NoP} Res_{desj}} \right). \quad [9]$$

The optimization is N-P complete. Thus, a greedy technique may be employed for computing the optimization in some examples.

Figure 2:
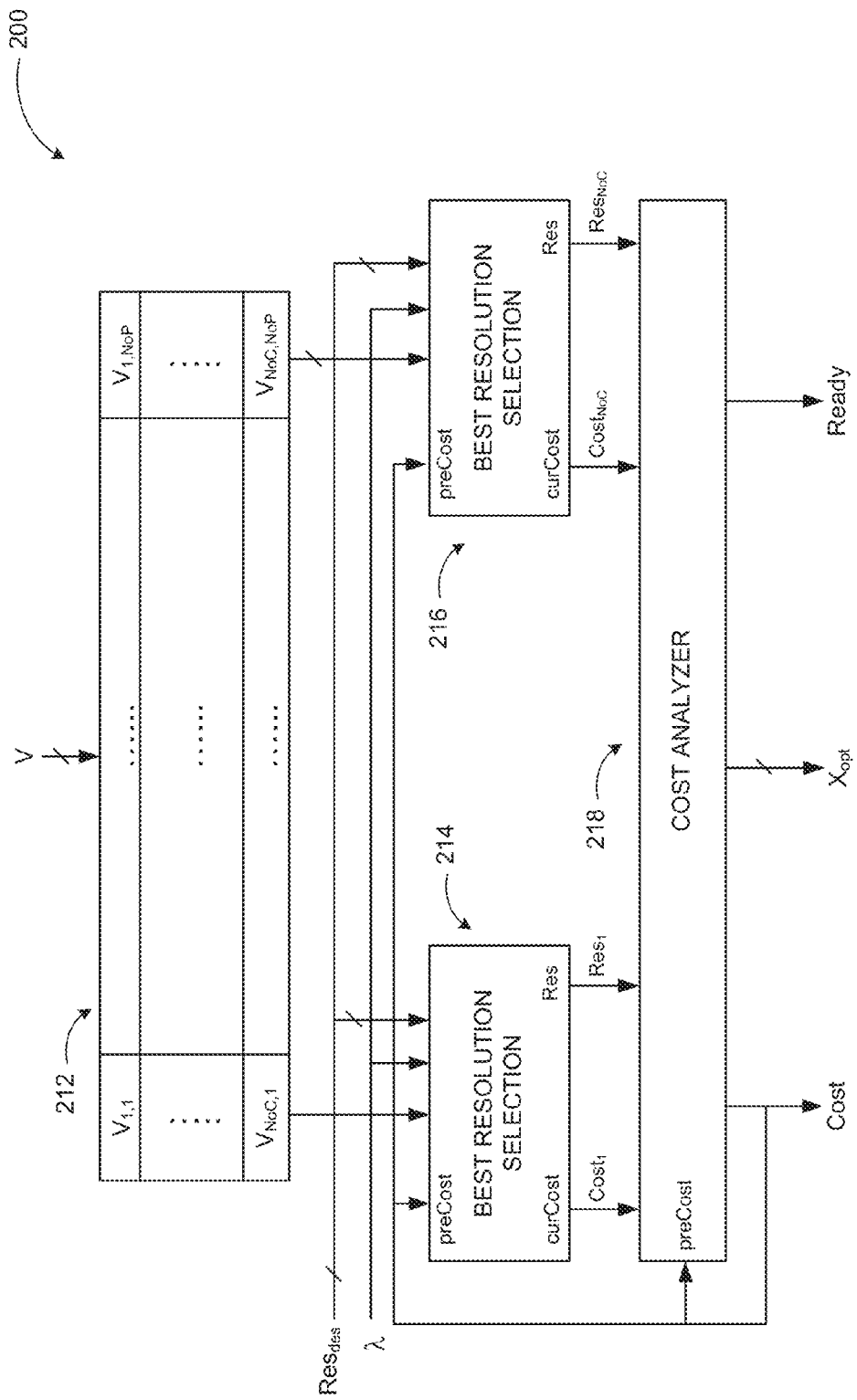
FIG. 2 illustrates a block diagram of an example system employing the greedy method for optimal camera selection in an array of cameras for monitoring and surveillance applications.

FIG. 2 illustrates a block diagram of an example system employing the greedy method for optimal camera selection in an array of cameras for monitoring and surveillance applications, arranged in accordance with at least some embodiments described herein.

In the optimization discussed above, a greedy method may be employed in a resolution-first camera assignment approach. Employing the greedy method may provide. Acceptable results with relatively high speed and low complexity, thus avoiding an increased need for computational system resources. In the example implementation discussed below, more weight may be given to the resolution cost rather than the number of ON cameras cost.

A greedy method according to some embodiments may minimize the total cost function iteratively. At each iteration, a camera may be selected and a resolution assigned to the camera such that the selected camera and its assigned resolution impose a largest reduction on the cost function among other choices. The iterations may continue until no other selections (camera or resolution) decrease the cost function, for example.

A diagram 200 illustrates how the iterative process may be performed. The inputs of the iterative process may include $Res_{des}$, an array of desired resolutions of target points; $\lambda$, a factor which determines the weight of one part of cost function over another part; and V, a matrix 212 which represents the maximum resolution that a camera observes a point.

For each camera, the best resolution may be selected through best resolution selection blocks 214, 216. For brevity two such blocks are shown, but one block for each camera may be employed in an example implementation. The best resolution for each camera may be the one that decreases the cost function more than other resolutions. In order to select the best resolution for a camera, the total cost function may be computed for all assignable resolutions. Then, the minimum value of computed costs and a corresponding resolution may be provided to an input of a cost analyzer block 218. The cost analyzer block 218 may determine the minimum cost among input costs ($Cost_1, \ldots Cost_{NoC}$) and compare the minimum cost with the cost of previous iteration (PreCost). In response to determining substantially no difference between the current minimum cost and the previous cost, the cost analyzer block 218 may terminate the iterations and provide a "Ready" signal. Else, the minimum cost may be fed to the best resolution selection blocks 214, 216 for the next iteration.

Figure 3:
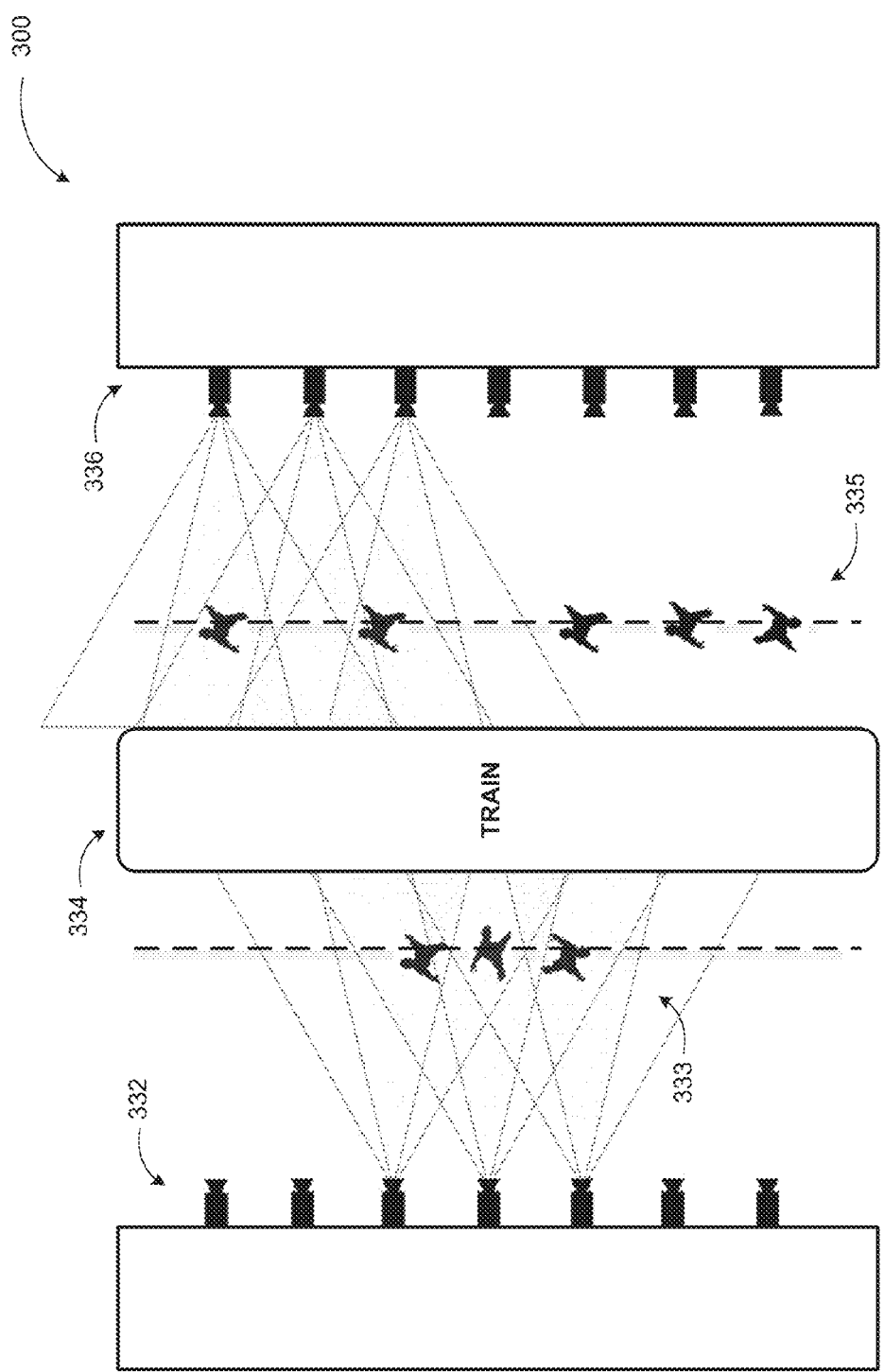
FIG. 3 illustrates an example one-dimensional scenario where people in a subway station are to be covered with cameras having two different resolutions.

FIG. 3 illustrates an example one-dimensional scenario where people in a subway station are to be covered with cameras having two different resolutions, arranged in accordance with at least some embodiments described herein.

In some examples, a special case of one-dimensional configurations, which have specific applications, may be considered. In such scenarios, the optimal solution may be achieved using combinatorial state Viterbi technique in some embodiments.

A diagram 300 depicts an example scenario for one-dimensional configurations. In the example scenario of the diagram 300, objects (people 333 and 335) in a subway station may be on either side of a train 334. As illustrated in a diagram 300, cameras 332 and 336 on either side of the tunnel may monitor the people 333 and 335 on their respective sides. An approximation may be made that people 333 and 335 are roughly standing on a line making the optimization a linear one.

In the example scenario, the cameras 332 and 336 may have two different resolutions (e.g., normal coverage are and higher resolution coverage area available via zoom). If a line can be fitted through the points (the people being monitored), for example based on the least squared error, and the points projected on the line such that the V matrix does not change, the optimal selection for the two-dimensional configuration may be determined by computing the one-dimensional configuration without loss of optimality. Thus, the two-dimensional approach may be simplified to a one-dimensional approach of intervals (parts of the objects on a line) which may be desired to be covered with different resolutions. In other embodiments, a point covering approach may be employed in the one-dimensional configuration.

Figure 4:
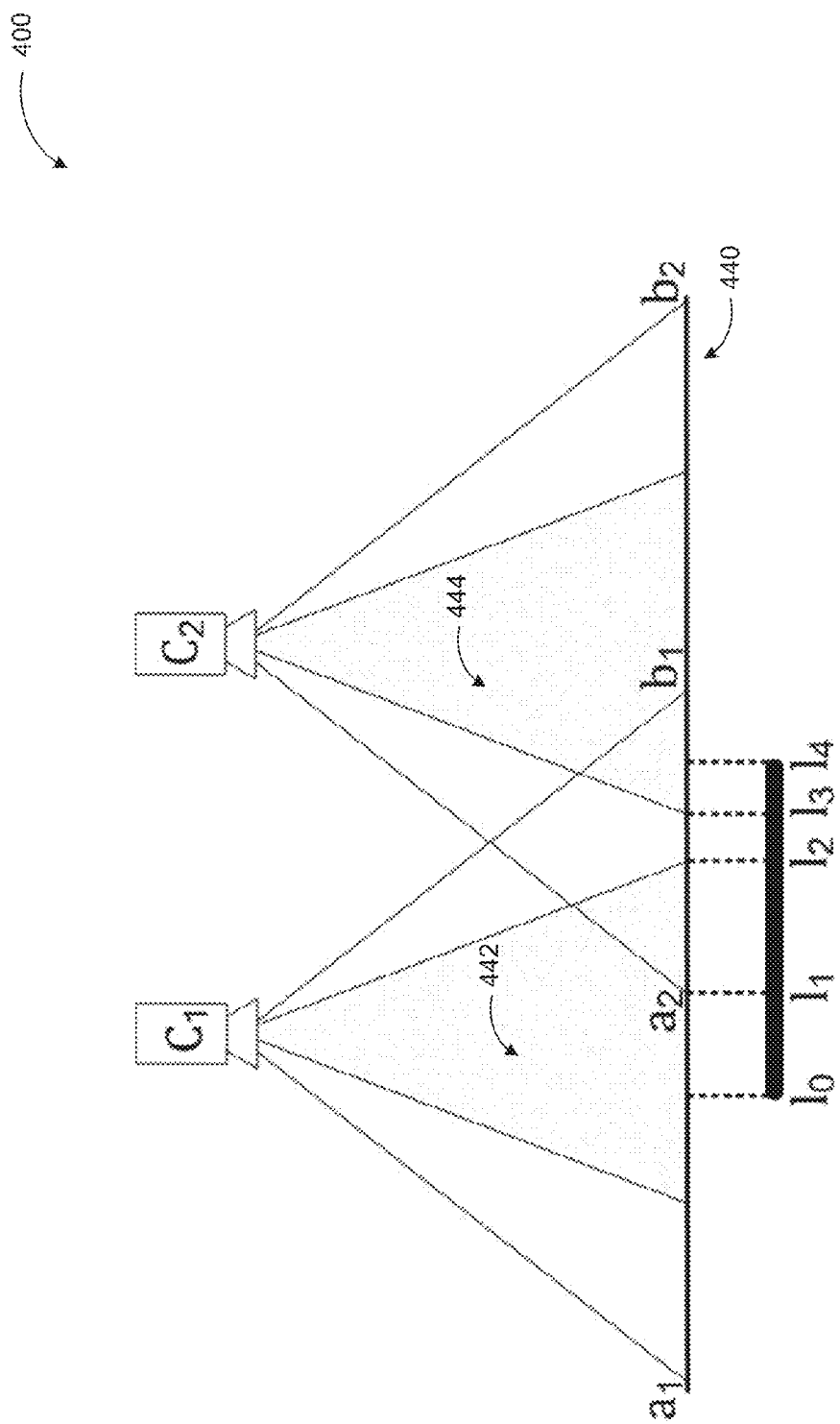
FIG. 4 illustrates an interval covering computation with a solid line segment that is divided into four sub-intervals.

FIG. 4 illustrates an interval covering computation with a solid line segment that is divided into four sub-intervals, arranged in accordance with at least some embodiments described herein.

Considering that in the multi-resolution camera assignment, a number of intervals with predetermined resolutions are to be covered, the computation may be converted to a technique in which instead of intervals, a number of points are covered, in some example embodiments. Thus, each interval may be broken down into a number of sub-intervals and a point may be considered as the representative of each sub-interval. Then the optimization may be performed for the points.

The interval of the coverage area of $i^{th}$ camera sensor may be represented by $[a_i, b_i]$. The intervals along the line 440 may be converted to points as follows. The beginning ($l_{int}$) and the end of interval ($u_{int}$) may be considered and the beginnings and ends of the cameras coverage boundaries of any resolutions sorted.

a diagram 400 depicts cameras C1 and C2 observe an interval under consideration 445 with high resolution coverages 442 and 444, respectively. The interval under consideration 445 is depicted as solid line segment and is segmented to four sub-intervals. As shown on the diagram 400, $l_{int}$ may be $I_0$ and $u_{int}$ may be $I_4$ in the example scenario. All points on each sub-interval may be covered with the same cameras and resolutions. Thus, a single point may be considered as a representative of each sub-interval.

Figure 5:
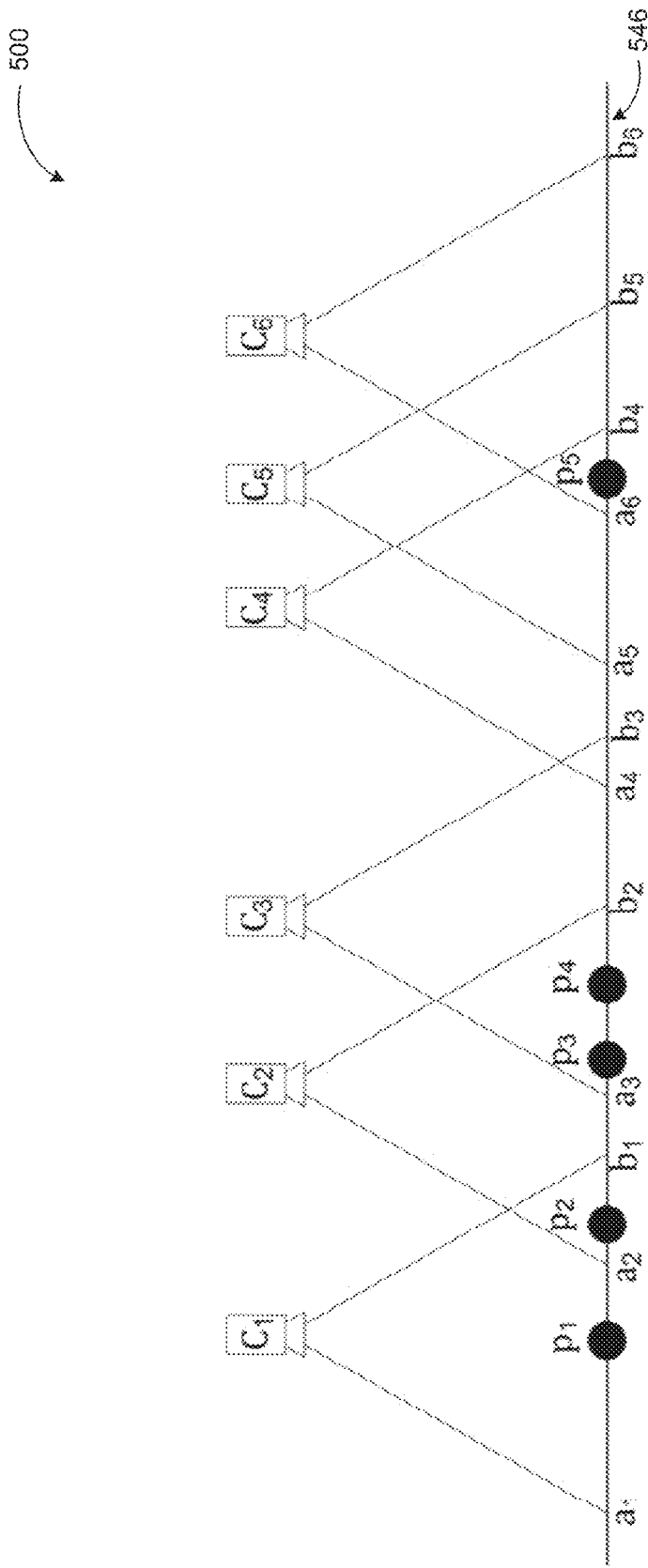
FIG. 5 illustrates an example one-dimensional single resolution scenario of six cameras with different coverage areas.

FIG. 5 illustrates an example one-dimensional single resolution scenario of six cameras with different coverage areas, arranged in accordance with at least some embodiments described herein.

A diagram 500 illustrates an example scenario with a number of cameras (C1 through C6) covering a line 546, where the cameras may have overlap in their coverage areas. As shown in the diagram 500, there are six cameras C1 through C6 with different coverage areas ($a_1, b_1; a_2, b_2; \ldots a_6, b_6$) and also five points ($p_1$ through $p_5$) to be covered. In the example scenario, no resolution is assigned to the points. Therefore, the cameras' resolutions do not change and the aim is to cover the points with minimum number of cameras. Thus, a discrete (combinatorial) optimization technique may be applied. An assumption may be made that the points may be on a substantially straight line and the coverage of each camera may be defined with an interval. Thus, the points, $p_i$, represent objects or parts of the objects on a real number axis.

Taking advantage of the order among the points on the real number axis and without loss of generality, the computation may begin from the most left-hand side point ($p_1$). Starting from the point, $p_1$, a camera with the maximum coverage on the real axis may be selected after the $p_1$ location. This selection may be considered as equivalent to the selection of the interval which contains the point and has the largest $b_i$ (the end of the camera coverage interval). By selecting the interval with the point $p_1$ and the largest $b_i$, any possible optimal selection is not lost because after this selection, any other interval may be selected without any restriction. Thus, optimality is not lost.

On the other hand, among the cameras which cover the desired point, a camera which has the maximum coverage or (in other words the greatest likelihood to cover other points) may be selected. By performing the selection of the initial camera as described, the computation may move toward selecting the optimal cameras. For the next point, a determination may be made whether the next point is covered or not. If the next point is covered, the computation may move to the subsequent point. If the next point is not covered, the selection of the first point may be repeated for the next point as well. The selection process may be iteratively repeated until all points are covered.

The above-described approach may be applied in reverse direction starting at the most right-hand side point ($p_5$) as well selecting cameras with maximum coverage on the real axis from the most right-hand side point toward the left.

Figure 6:
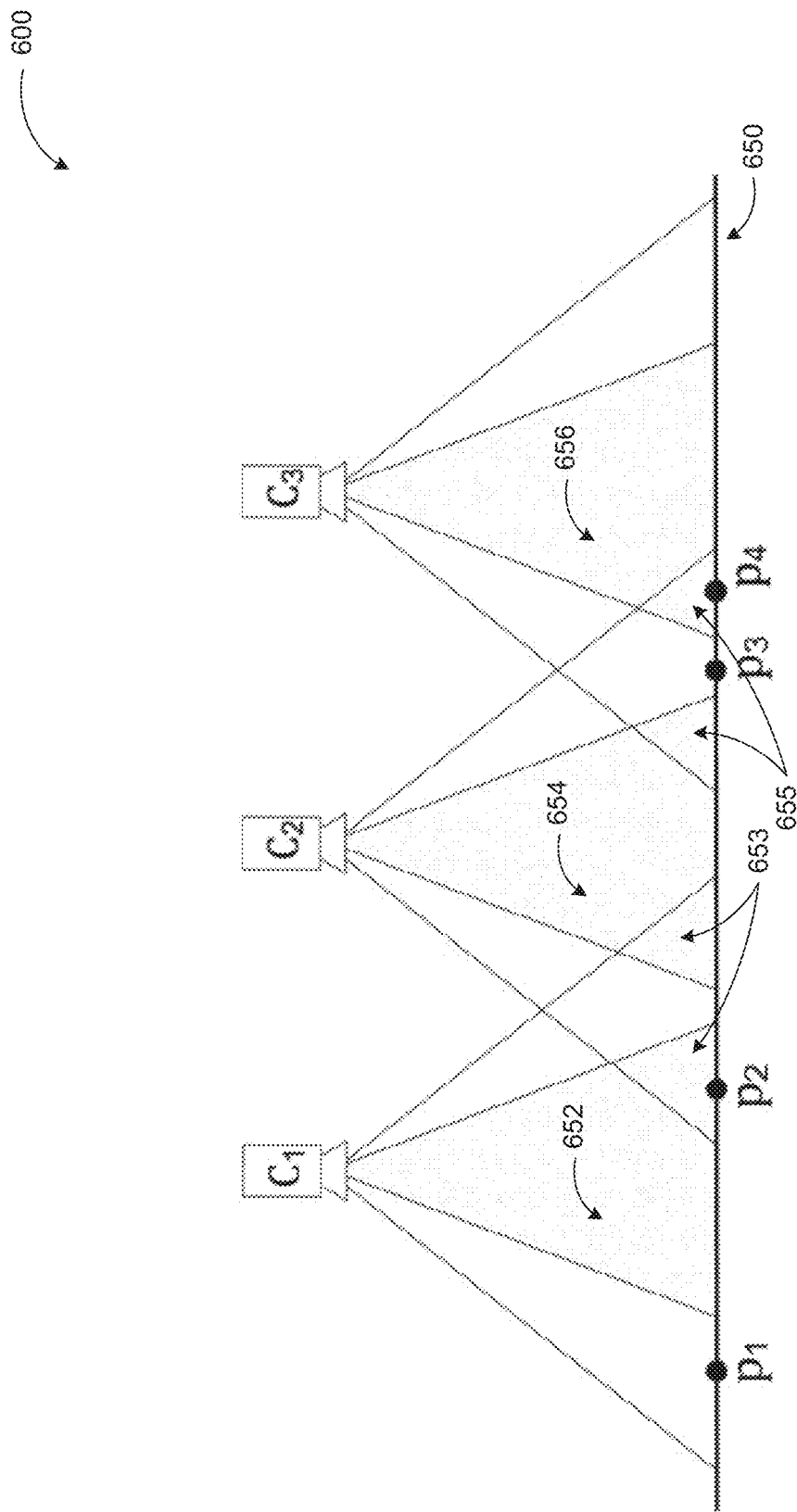
FIG. 6 illustrates another example one-dimensional multi-resolution camera configuration with three cameras, where each camera has two resolutions and four points to be covered.

FIG. 6 illustrates another example one-dimensional multi-resolution camera configuration with three cameras, where each camera has two resolutions and four points to be covered, arranged in accordance with at least some embodiments described herein.

As mentioned previously, the one-dimensional single resolution scenario is a generalization of the multi-resolution configuration and a special case of the two-dimensional configuration. Therefore, the same cost functions as discussed in the two-dimensional case may be minimized. As in the two-dimensional configuration each camera may be set to different resolutions but one at a time in case of the one-dimensional multi-resolution camera configuration. In some examples, different resolutions of single camera may be considered as distinct cameras with different coverage areas or as intervals with different lengths. A diagram 600 shows an example configurations with three cameras C1, C2, and C3.

In the diagram 600, the cameras C1, C2, and C3 have, each, a low resolution coverage and a high resolution coverage (652, 654, 656, respectively). Points p1 through p4 to be covered are lined along the line 650. While the point p1 is in the low resolution coverage area of the camera C1, the points p2, p3, and p4 are in overlapping coverage areas. For example, the point p2 is in an overlap area 653 that is covered by the high resolution coverage 652 of the camera C1 and the low resolution coverage of the camera C2. The point p3 is in an area covered by the low resolution coverages of the camera C2 and C3. The point p4 is in an overlap area 655 covered by the low resolution coverage of the camera C2 and by the high resolution coverage 656 of the camera C3.

Optimizing the illustrated example configuration, the same cost function [7] as in the two-dimensional case may be used with the difference that:

$$\text{Resolutions cost} = L^* Res_{desint} - \Sigma_{i=1} len_i^* Res_{assi} = \Sigma_{i=1} len_i^*(Res_{desint} - Res_{assi}), \quad [10]$$

where L and $Res_{desint}$ are the length and desired resolution of the original interval respectively. Also, $len_i$ and $Res_{assi}$ are the length of and the assigned resolution to each interval respectively. Minimizing the above cost may be substantially equal to minimizing the term in the parentheses for every value of i. Since the cost is a linear combination of sub-costs with positive coefficients, in order to minimize the overall cost, the cost of each sub-interval may be independently minimized.

Among the points which are desired to be seen with the same resolution and are similar in terms of cameras that cover them, one point may be considered and the others removed. If one of them is covered with a minimum error, the others may be covered with the same error because their situations may be identical and if a camera is assigned to one of them, others may be seen with the same camera and resolution. The property for removing some points may be used in this example scenario and the points in each interval may be removed except one. The selected point may be the representative of its respective interval and the selection may be arbitrary. As a non-conflicting choice, the middle point of each interval may be selected as its representative, for example. It should be noted that when all of the intervals are considered, the sub-interval length may be multiplied by the desired resolution in order to count a length to the total resolution cost. Thus, the point covering technique may include selection of a middle point for each sub-interval and the cost may be the desired resolution of that sub-interval multiplied by the length of it.

Figure 7:
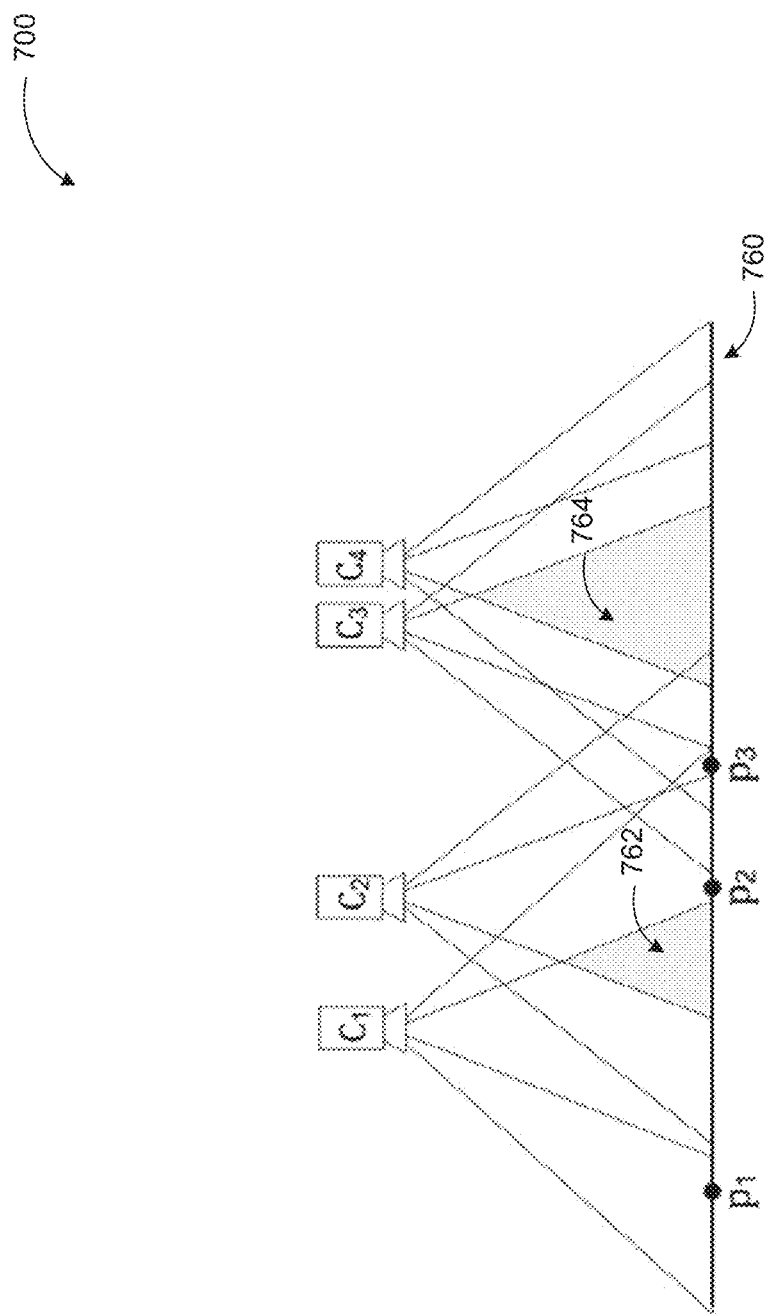
FIG. 7 illustrates a further example one-dimensional multi-resolution camera configuration with four cameras, where each camera has two resolutions and three points to be covered.

FIG. 7 illustrates a further example one-dimensional multi-resolution camera configuration with four cameras, where each camera has two resolutions and three points to be covered, arranged in accordance with a least some embodiments described herein.

An example scenario is shown in a diagram 700 with four multi-resolution cameras C1 through C4. According to the example scenario, the camera resolutions may vary between 1 and 4 and the three points p1, p2, and p3, may be desired to be covered with resolutions 1, 4, and 1, respectively. To provide optimum coverage and desired resolutions to the points lines up along the line 760, a combinatorial state trellis technique may be employed as discussed in more detail below in conjunction with FIG. 8 and FIG. 9.

The result of the optimization may provide a low resolution coverage 762 of the camera C1 to p1, a high resolution coverage 764 of the camera C2 to p2, and low resolution coverage 766 of the camera C3 to p3. The optimization may select resolution zero for the cameras 3 and 4 meaning these cameras are not selected and may be turned off.

Figure 8:
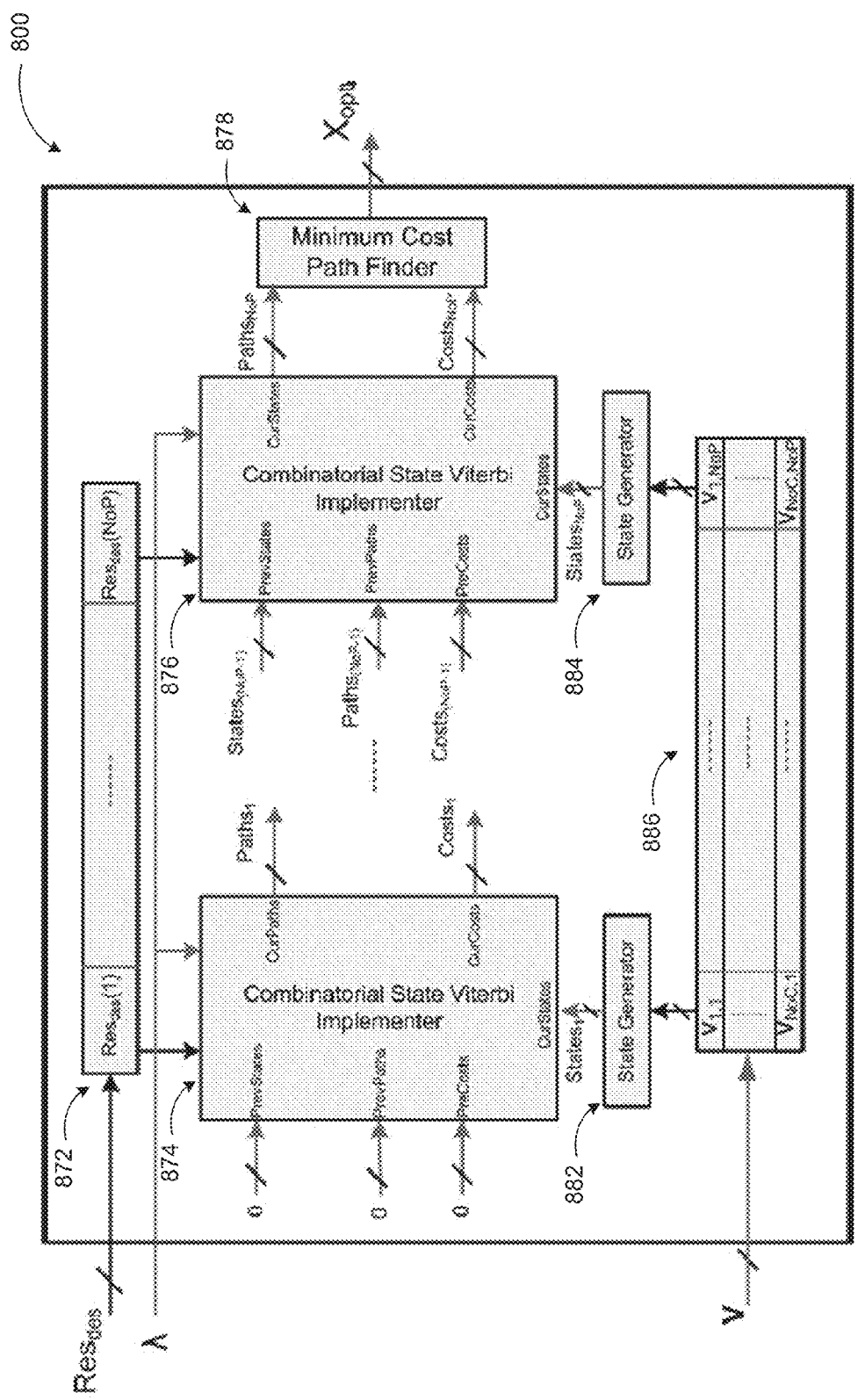
FIG. 8 illustrates a block diagram of an example system employing a combinatorial state Viterbi technique for optimal camera selection in an array of cameras for monitoring and surveillance applications.

FIG. 8 illustrates a block diagram of an example system employing a combinatorial state Viterbi technique for optimal camera selection in an array of cameras for monitoring and surveillance applications, arranged in accordance with at least some embodiments described herein.

The example block diagram of the combinatorial state Viterbi technique shown in a diagram 800 includes state generators 882, 884, which may take a V matrix 886 as input and generate combinations of cameras and resolutions (i.e. states) with which a target point may be observed. The states may be provided from the state generators 882, 884 to combinatorial state Viterbi implementers 874, 876, which with some modifications to the Viterbi algorithm, may select the best path to each state and calculate the cost based on the selected path. While two generators and combinatorial state Viterbi implementers are shown for illustration purposes, a plurality of those blocks may be employed in practical implementations, for example, one for each column for the V matrix 886. The combinatorial state Viterbi implementers 874, 876 may able receive a $Res_{des}$ vector 872 representing desired resolutions for the different cameras as input. A λ parameter defining weighting among the different cameras may also be provided to the combinatorial state Viterbi implementers 874, 876. A minimum cost path finder block 878 may determine a state among the states of the last branch that results in the minimum cost.

In some examples, an exhaustive search which considers all eligible (consistent) cases, computes that cost of each case, and chooses the case with the lowest cost may be employed in selecting optimal camera configuration. In an example multi-resolution configuration, two different exhaustive search approaches may be employed. First, approach (exhaustive search on the points) may consider the points and possible scenarios of camera assignment to the points. After determining the possible (not necessarily eligible) scenarios of cameras and their resolutions, the resolution consistency may be examined and scenarios which violate the consistency may be omitted. Among the remaining scenarios, a scenario with the lowest cost may be selected. When a camera is considered for a point, the camera may be set on resolution zero meaning that camera has not been selected (it is off) or set on a resolution that cannot see the point to which the camera is assigned to.

Another approach (exhaustive search on the cameras) may consider the cameras and test possible resolutions for each camera. In this case there may not be a need to check the consistency because each camera is considered once an assigned a resolution (including resolution zero). Depending on the number of points and cameras, the two approaches may differ in time/computational complexity.

In further embodiments, a Viterbi technique may be applied to a well-defined trellis to determine the optimal configuration. An optimal low complexity combinational-state trellis that takes resolution constraint into consideration may be used. In the trellis, a level may be considered for each point and possible combinations of cameras resolutions covering a point may be listed as states on the level. Resolution constraint may be obeyed in each path that is traversed in the trellis. In this approach, transitions may be formed from one level (point) to the next level, while resolution consistency is followed for the common cameras corresponding to the start and end states of each transition. It should be noted that the coverage area of each camera on a real axis is contiguous and includes one segment. Thus, when examining for resolution consistency in a path, the resolution consistency may be examined from one level to the next without having to examine previous levels of the path because when the current camera is not seen in the previous level, it means that the current level is the first time that the camera is selected in the examined path.

The resolution consistency for a camera may also be not needed to be examined in the future states on the path where the camera is not present. Because there is the possibility of making a decision about the future branches to a state and selecting an optimum one (which has the minimum cost) without considering the past and the future of the path, the Viterbi technique may be applied directly to find the survival path in a trellis. The total cost of each transition may be defined to be a linear combination of the number of cameras and resolution costs with equal weight, as discussed previously.

Camera resolution consistency in transitions from one level to the next may allow transition which begins from one resolution of a camera and ends in a different resolution of the same camera. There may be some exceptions in the case of resolution zero (when camera is not selected). Transitions from resolution zero to any other resolutions and vice versa may be allowed subject to the following restrictions.

Transition from a non-zero resolution to a zero resolution may be allowed if the maximum possible resolution in the next level is less than the resolution in the start of the transition. For example, the resolution of the camera corresponding to the start state of the transition may be 2. This means that the camera needs to be set to have a resolution of 2 in the current path. If the camera covers the next level (point) with a resolution of 2 or more, the camera cannot be transitioned to resolution zero because the camera can also see the next point with a resolution of 2 and choice of resolution zero violates the resolution consistency. However, if the maximum available resolution in the next level is 1, a transition may be made from resolution 2 to zero. This scenario may occur when the range of coverage of a camera with a resolution of 2 ends at the beginning of the branch in the previous level and it can only see the next point when set on resolution 1.

Another constraint may be the dual of the above-discussed constraint and may occur when a transition is attempted from resolution zero to a non-zero one. Such a transition may be performed if the maximum resolution in the previous level is less than the non-zero resolution of the desired state.

When a transition is made from a non-zero resolution (x) to zero, the indication is that the coverage interval of the camera with resolution x has ended before the next level and there may not be a transition to any non-zero resolutions in the future of this path. This means that non-zero to zero and then zero to non-zero transition may not occur anywhere in a path. Thus, such transitions may be monitored for each path and variable (e.g., a "check" variable) may be set to predefined value when such a transition happens and the branch selected as the branch with lowest cost that enters the current state.

In some examples, keeping track of such transitions (from non-zero to zero) once for all paths (equivalently once for each camera) may be sufficient and not for every single path. If the check variable is set to the predefined value and the resolution of the current state of the current path is zero, then the transition from non-zero to zero may need to necessarily occur once in the current path. Thus, the check variable may be set to the predefined value if the transition branch from non-zero to zero is selected as the survival path going to the state with resolution zero in the next level.

Embodiments are not limited to the above-discussed configurations or techniques. Other optimization techniques and camera configurations with multi-resolution, multidirectional (e.g. PTZ) cameras may also be selected for optimal configuration using the principles discussed herein. Furthermore, the principles discussed here may be applied to lighting systems for generating an optimal light subset in a lighting array that achieves a desired intensity for an area of illumination.

Figure 9:
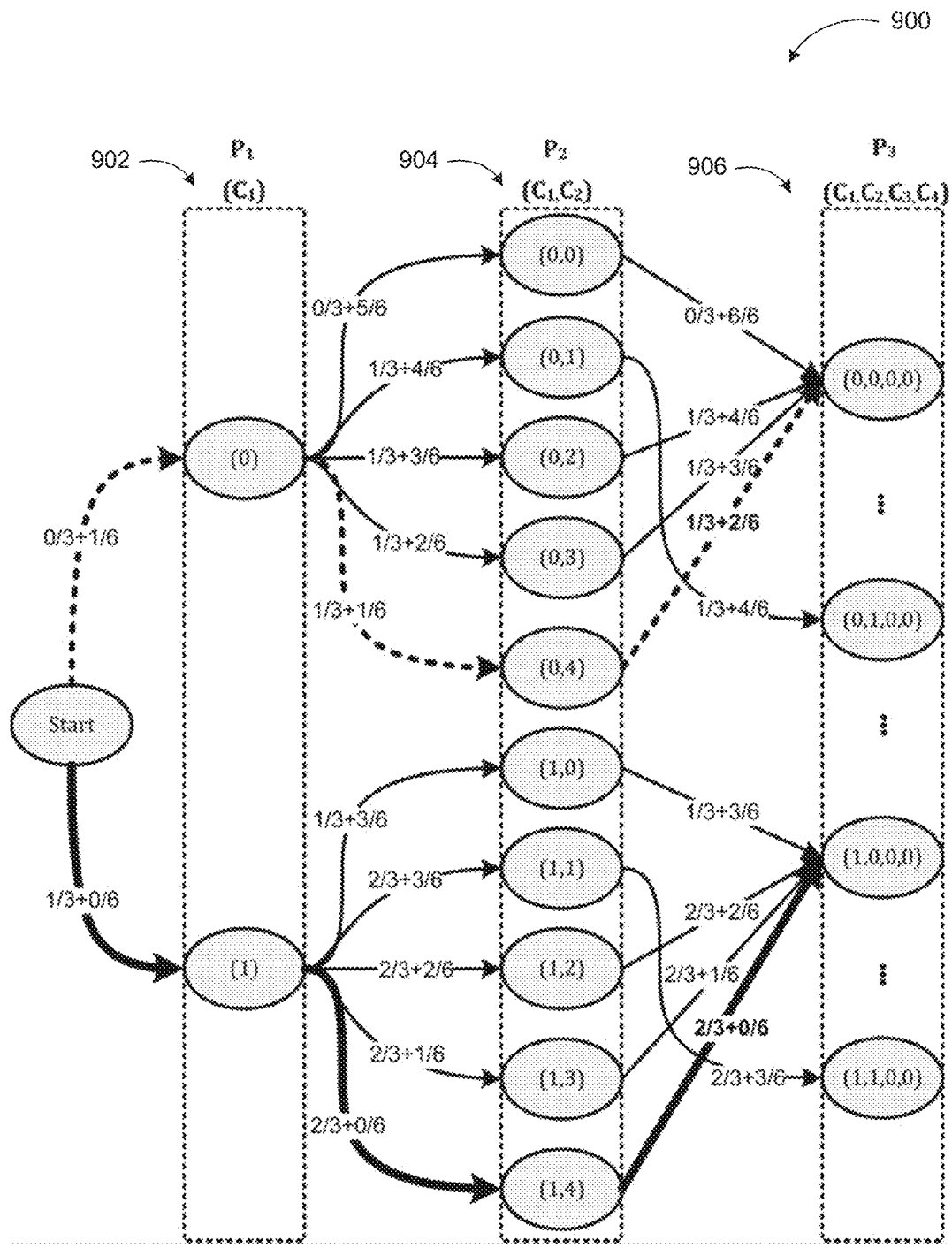
FIG. 9 illustrates a trellis of the combinatorial states trellis technique when applied to the example scenario of FIG. 7.

FIG. 9 illustrates a trellis of the combinatorial state trellis technique when applied to the example scenario of FIG. 7, arranged in accordance with at least some embodiments described herein.

A depiction of a trellis for the combinatorial state trellis technique that may be applied to the example scenario of FIG. 7 is shown in a diagram 900. For brevity, some of the transitions including the optimal one to the third level are depicted on the diagram 900. The technique does not decide among different resolutions of a camera in finding the optimal configuration. The optimal configuration path is shown with a bold line as the survival path. The survival path starts with the options 902 for p1 and C1, where C1 is determined to be ON. Next, different configurations of C1 and C2 (options 904) are considered for p2 and the combination of C1 having the lowest resolution (1) and C2 having the highest resolution (4) is selected). Subsequently, options 906 for all four cameras and p3 are considered leading to the determination that the cameras C2, C3, and C4 are not needed for this point. Thus, the survival path is (1)→(1,4) →(1,0,0,0).

By modifying that states and V matrix, the same technique may be applied to the k-coverage in multidirectional camera sensors in one-dimensional configurations, a one-dimensional scenario of pan-tilt-zoom (PTZ) cameras, or a one-dimensional case of multi-resolution/multidirectional cameras. For example for a multidirectional scenario, different combinations of directions may be considered as states on each branch of the trellis. Direction 0 for each camera may also be considered representing when the camera is off or a current point cannot be seen with the selected direction of the camera. In the directional camera scenario, the V matrix may be changed to a direction matrix (D) such that each component $d_{i,j}$ shows the direction in which camera i can see point j. As another example for a multi-resolution/multidirectional scenario in one dimension, combinatorial states to two component vectors may be used where the first component may show the direction and the second component may show the maximum resolution with which each camera can see a current point.

Figure 10:
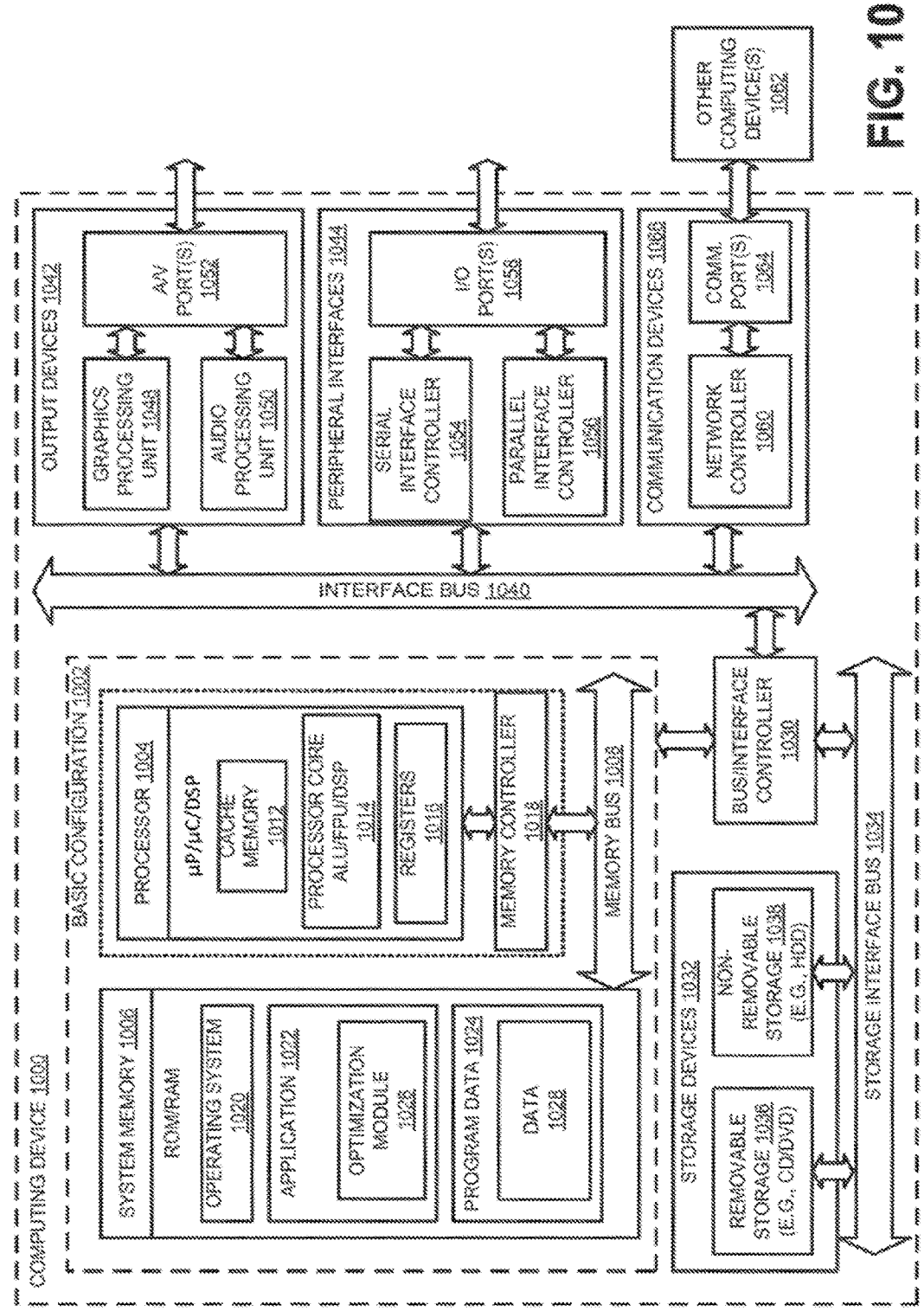
FIG. 10 illustrates a general purpose computing device, which may be used to manage optimal camera selection in an array of cameras for monitoring and surveillance applications.

FIG. 10 illustrates a general purpose computing device, which may be used to mange optimal camera selection in an array of cameras for monitoring and surveillance applications, arranged in accordance with at least some embodiments described herein.

For example, the computing device 1000 may be used as a server, desktop computer, portable computer, smart phone, special purpose computer, or similar device such as a controller at a utility control center or a controller at a micro grid. In an example basic configuration 1002, the computing device 1000 may include one or more processors 1004 and a system memory 1006. A memory bus 1008 may be used for communicating between the processor 1004 and the system memory 1006. The basic configuration 1002 is illustrated in FIG. 10 by those components within the inner dashed line.

Depending on the desired configurations, the processor 1004 may be any type, including but not limited to a microprocessor (μP), a microcontroller (μC), a digital signal processor (DSP), or any combination thereof. The processor 1004 may include one more levels of caching, such as a cache memory 1012, one or more processor cores 1014, and registers 1016. The example processor cores 1014 may (each) include an arithmetic logic unit (ALU), a floating point unit (FPU), a digital signal processing core (DSP Core), or any combination thereof. An example memory controller 1018 may also be used with the processor 1004, or in some implementations the memory controller 1018 may be an internal part of the processor 1004.

Depending on the desired configuration, the system memory 1006 may be of any type including but not limited to volatile memory (such as RAM), non-volatile memory (such as ROM, flash memory, etc.) or any combination thereof. The system memory 1006 may include an operating system 1020, one or more applications 1022, and program data 1024. The application 1022 may include an optimization module 1026, which may be an integral part of the application 1022 or a separate application on its own. The optimization module 1026 may perform optimal camera selection in an array of cameras for monitoring and surveillance applications, as described herein. The program data 1024 may include, among other data, data 1028 related to camera positions, resolutions, or the like, as described herein.

The computing device 1000 may have additional features or functionality, and additional interfaces to facilitate communications between the basic configuration 1002 and any desired devices and interfaces. For example, a bus/interface controller 1030 may be used to facilitate communications between the basic configuration 1002 and one or more data storage devices 1032 via a storage interface bus 1034. The data storage devices 1032 may be one or more removable storage devices 1036, one or more non-removable storage devices 1038, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1006, the removable storage devices 1036 and the non-removable storage devices 1038 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 1000. Any such computer storage media may be part of the computing device 1000.

The computing device 1000 may also include an interface bus 1040 for facilitating communication from various interface devices (e.g., one or more output devices 1042, one or more peripheral interfaces 1044, and one or more communication devices 1066) to the basic configuration 1002 via the bus/interface controller 1030. Some of the example output devices 1042 include a graphics processing unit 1048 and an audio processing unit 1050, which may be configured to communicate to various external devices such as a display or speakers via one or more A/V ports 1052. One or more example peripheral interfaces 1044 may include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1066 includes a network controller 1060, which may be arranged to facilitate communications with one or more other computing devices 1062 over a network communication link via one or more communication ports 1064. The one or more other computing devices 1062 may include servers, camera controller, and comparable devices.

The network communication link may be one example of a communication media communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 1000 may be implemented as a part of a general purpose or Specialized server, mainframe, or similar computer that includes any of the above functions. The computing device 1000 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 11:
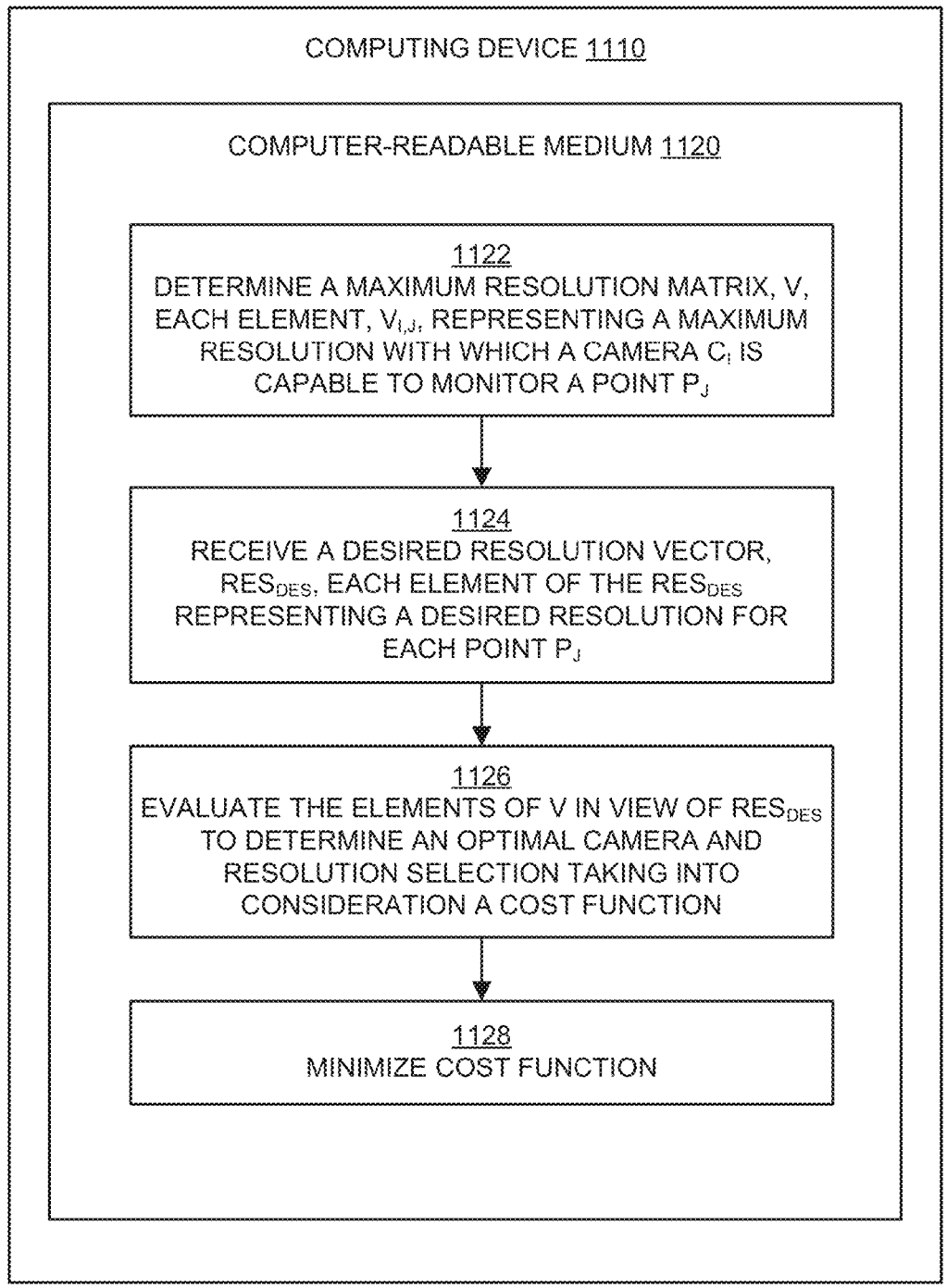
FIG. 11 is a flow diagram illustrating an example method that may be performed by a computing device such as the computing device in FIG. 10.

FIG. 11 is a flow diagram illustrating an example method that may be performed by a computing device such as the computing device in FIG. 10, arranged in accordance with at least some embodiments described herein.

Example methods may include one or more operations, functions or actions as illustrated by one or more blocks 1122, 1124, 1126, and/or 1128. The operations described in the blocks 1122 through 1128 may also be stored as computer-executable instructions in a computer-readable medium such as a computer-readable medium 1120 of a computing device 1110.

An example process for optimal camera selection in array of cameras for monitoring and surveillance applications may begin with block 1122, "DETERMINE A MAXIMUM RESOLUTION MATRIX, V. EACH ELEMENT, $V_{I,J}$, REPRESENTING A MAXIMUM RESOLUTION WITH WHICH A CAMERA $C_1$ IS CAPABLE TO MONITOR A POINT $P_J$", where a maximum resolution matrix such as matrix V (212) may be determined by a processor of a controller for a monitoring application.

Block 1122 may be followed by block 1124, "RECEIVED A DESIRED RESOLUTION VECTOR, $RES_{DES}$, EACH ELEMENT OF THE $RES_{DES}$ REPRESENTING A DESIRED RESOLUTION FOR EACH POINT $P_J$", where desired resolution information may be received, for example, from a user or an automated system such as one that aims to perform facial recognition in a public area.

Block 1124 may be followed by block 1126, "EVALUATE THE ELEMENTS OF V IN VIEW OF $RES_{DES}$ TO DETERMINE AN OPTIMAL CAMERA AND RESOLUTION SELECTION TAKING INTO CONSIDERATION A COST FUNCTION", where the resolutions and cameras may be evaluated through an iterative greedy technique or a combinatorial-state trellis computation (employing Viterbi technique) by a best resolution selection module 216, for example.

Block 1126 may be followed by block 1128, "MINIMIZE COST FUNCTION", where the cost function may be minimized by a cost analyzer block 218, for example. The evaluation techniques may also be applied in lighting applications, where selected areas may be associated with desired lighting intensities from an array of lights.

The blocks included in the above described process are for illustration purposes. Optimal camera selection in array of cameras for monitoring and surveillance applications may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 12:
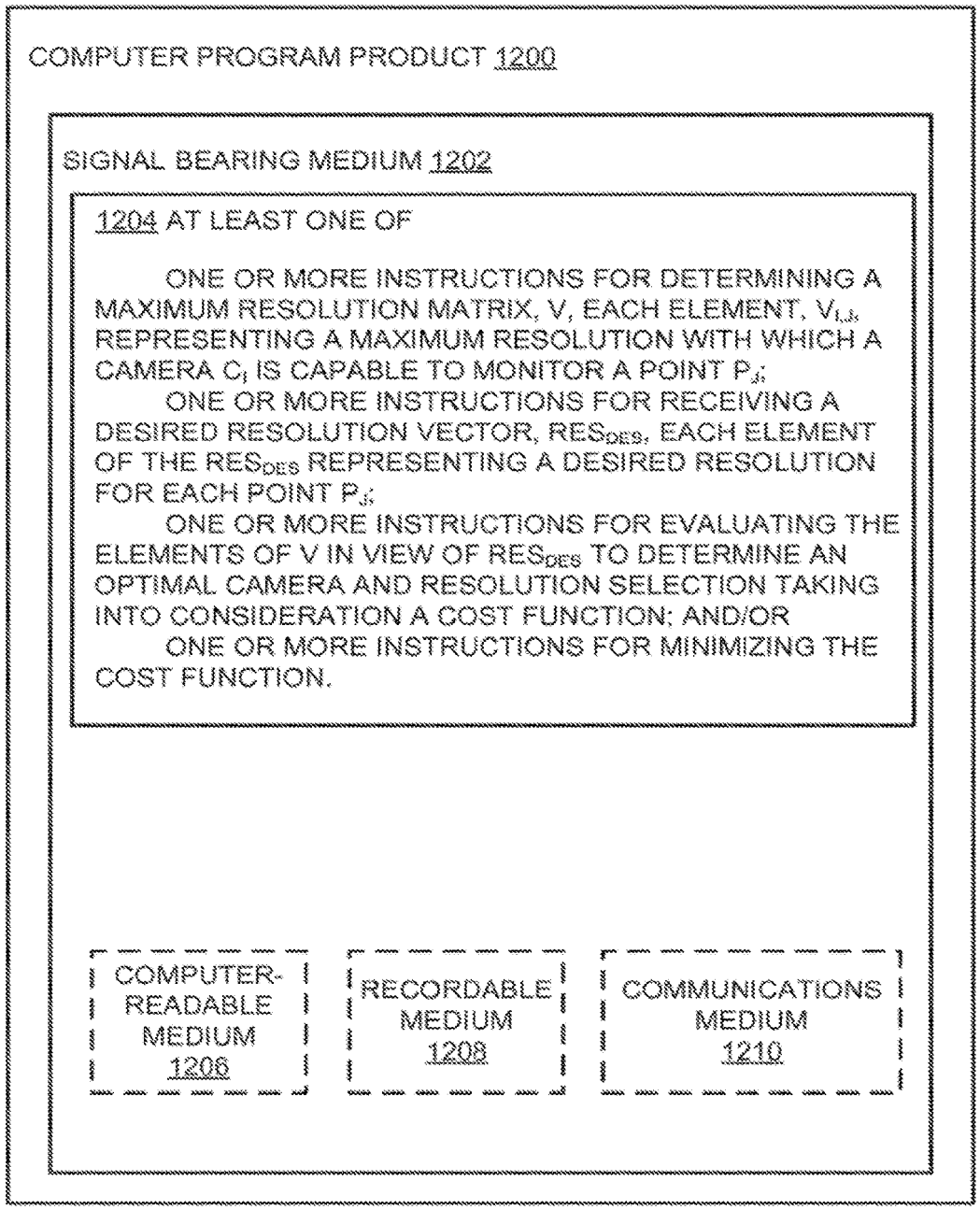
FIG. 12 illustrates a block diagram of an example computer program product, all arranged in accordance with a least some embodiments described herein.

FIG. 12 illustrates block diagram of an example computer program products, arranged in accordance with at least some embodiments described herein.

In some embodiments, as shown in FIG. 12, the computer program product 1200 may include a signal bearing medium 1202 that may also include one or more machine readable instructions 1204 that, when executed by, for example, a processor, may provide the functionality described herein. Thus, for example, referring to the processor 1004 in FIG. 10, an optimization module 1026 executed on the processor 1004 may undertake one or more of the tasks shown in FIG. 12 in response to the instructions 1204 conveyed to the processor 1004 by the signal bearing medium 1202 to perform actions associated with optimal camera selection in array of cameras for monitoring and surveillance applications as described herein. Some of those instructions may include, for example, instructions for determining a maximum resolution matrix, V, each element, $v_{i,j}$, representing a maximum resolution with which a camera $c_i$ is capable to monitor a point $p_j$; receiving a desired resolution vector, $Res_{des}$, each element of the $Res_{des}$ representing a desired resolution for each point $p_j$; evaluating the elements of V in view of $Res_{des}$ to determine an optimal camera and resolution selection taking into consideration a cost function; minimizing the cost function according to some embodiments described herein.

In some implementations, the signal bearing medium 1202 depicted in FIG. 12 may encompass a computer-readable medium 1206, such as, but not limited to, a hard disk drive, a solid state drive, a Compact Disc (CD), a Digital Versatile Disk (DVD), a digital tape, memory, etc. In some implementations, the signal bearing medium 1202 may encompass a recordable medium 1208, such as, but not limited to, memory, read/write (R/W) CDs, R/W DVDs, etc. In some implementations, the signal bearing medium 1202 may encompass a communications medium 1210, such as, but not limited to, a digital and/or an analog communication medium (e.g., a fiber optic cable, a waveguide, a wired communications link, a wireless communication link, etc.). Thus, for example, the computer program product 1200 may be conveyed to one or more modules of the processor 1004 of FIG. 10 by an RF signal bearing medium, where the signal bearing medium 1202 is conveyed by the wireless communications medium 1210 (e.g., a wireless communications medium conforming with the IEEE 802.11 standard).

According to some examples, methods for automatically optimizing an efficiency of camera placement, numbers, and resolution in a multi-camera monitoring environment are described. Example methods may include determining a maximum resolution matrix, V, where each element, $v_{i,j}$, of the v represents a maximum resolution with which a camera $c_i$ is capable to monitor a point $p_j$ in the multi-camera environment; receiving a desired resolution vector, $Res_{des}$, where each element of the $Res_{des}$ represents a desired resolution for each point; and evaluating the elements of the V in view of the $Res_{des}$ to determine an optimal camera and resolution selection taking into consideration a cost function, where the cost function includes at least an error in a resolution assigned to each point.

According to other examples, the methods may further include evaluating the elements of the V in view of a weighting parameter for the cost function; linearly combining a number of selected cameras' cost and the error in the resolution cost with the weighting parameter to determine a total cost; and/or minimizing the total cost to determine an optimal selection of cameras and resolutions to monitor predefined points in the multi-camera monitoring environment with desired resolutions. The methods may also include employing a greedy technique to minimize the total cost iteratively; selecting a camera and assigning a resolution to the selected camera such that the selected camera and the assigned resolution impose a largest reduction on the total cost at each iteration; and continuing the iterations until no other camera or resolution selection decreases the cost function.

According to further examples, the methods may include receiving the resolutions defined for intervals along a linear axis; and selecting the points to represent the intervals. The methods may further include selecting the points as middle points of each interval and/or computing the cost for each interval as a product of a desired resolution for the interval and a length of the interval. Each resolution may represent a level of zoom. The cameras may include one of: a single resolution camera, a multi-resolution camera, a multidirectional camera, a multi-resolution/multidirectional camera, and pan-tilt-zoom (PTZ) camera.

According to other example, a computing device operable to automatically optimize an efficiency of camera placement, numbers, and resolution in a multi-camera monitoring environment is described. The computing device may include a memory configured to store instructions; an input device configured to receive a desired resolution vector, $Res_{des}$, where each element of the $Res_{des}$ represents a desired resolution for each point in the multi-camera environment; and a processor. The processor may be configured to determine a maximum resolution matrix, V, where each element, $v_{i,j}$, of the V represents a maximum resolution with which a camera $c_i$ is a capable to monitor a point $p_j$ in the multi-camera environment; and evaluate the elements of the V in view of the $Res_{des}$ to determine an optimal camera and resolution selection taking into consideration a cost function, where the cost function includes at least an error in a resolution assigned to each point.

According to some examples, the processor may also be configured to evaluate the elements of the V in view of a weighting parameter for the cost function; linearly combine a number of selected cameras' cost and the error in the resolution cost with the weighting parameter to determine a total cost; minimize the total cost to determine an optimal selection of cameras and resolutions to monitor predefined points in the multi-camera monitoring environment with desired resolutions; and/or employ a greedy technique to minimize the total cost iteratively.

According to yet other examples, the processor may be further configured to select a camera and assign a resolution to the selected camera such that the selected camera and the assigned resolution impose a largest reduction on the total cost as each iteration; and continue the iterations until no other camera or resolution selection decreases the cost function. The processor may also receive the resolutions defined for intervals along a linear axis and select the points to represent the intervals. The processor may further select the points as middle points of each interval and compute the cost for each interval as a product of s desired resolution for the interval and a length of the interval. Each resolution may represent a level of zoom. The cameras may include one of: a single resolution camera, a multi-resolution camera, a multidirectional camera, a multi-resolution/multidirectional camera, and a pan-tilt-zoom (PTZ) camera.

According to further examples, a method for optimal camera selection in array of cameras for monitoring and surveillance applications is described. An example method may include determining a plurality of resolutions associated with a plurality of cameras defined for intervals along a linear axis; receiving information associated with point on the intervals and desired resolutions for the points; forming a combinatorial state trellis, where each level represents a point according to a linear order of the points and possible combinations of camera resolutions covering the point are listed as states on a corresponding level; and evaluating optimal paths through the levels while obeying resolution constraints in each path that is traversed in the trellis until a survival path is determined.

According to some examples, the method may further include forming transitions from one level to a next level, while following a resolution consistency for common cameras corresponding to a start and an end state of each transition; enabling a transition from a non-zero resolution to a zero resolution in response to a determination that a maximum possible resolution in the next level is less than a resolution at a start of the transition; and/or enabling a transition from a zero resolution to a non-zero resolution in response to a determination that a maximum possible resolution in a previous level is less than a non-zero resolution of a desired state.

According to other example, the method may also include monitoring transitions from a non-zero resolution to a zero resolution for each path in the trellis; setting a variable to a predefined value when a transition from the non-zero resolution to the zero resolution occurs; and selecting a current branch as a branch with lowest cost that enters a current state. The method may further include defining combinations of directions for multidirectional cameras as states on each branch of the trellis and performing an exhaustive search by: examining all eligible combinations, computing a cost of each combination, and selecting a combination with a lowest cost.

According to yet other examples, the method may include evaluating the points and possible combinations of camera assignment to the points; upon determining one or more possible camera and resolution combinations for each point, examining a resolution consistency; omitting possible camera and resolution combinations that violate the resolution consistency; and selecting a camera and resolution combination among remaining camera and resolution combinations. The method may also include evaluating the cameras and testing possible resolutions for each camera without examining a resolution consistency; setting a resolution for a camera to zero in response to a determination that the camera is to be turned off of set to e resolution that fails to cover a point to which the camera is assigned; and/or defining a total cost of each transition as a linear combination of a number of cameras and resolution costs. The cameras may include one of: a single resolution camera, a multi-resolution camera, a multidirectional camera, a multi-resolution/multidirectional camera, and a pan-tilt-zoom (PTZ) camera.

According to further examples, a computing device for optimal camera selection in array of cameras for monitoring and surveillance applications is described. The computing device may include a memory configured to store instructions and a processor. The processor may be configured to determine a plurality of resolutions associated with a plurality of cameras defined for intervals along a linear axis; receive information associated with points on the intervals and desired resolutions for the points; form a combinatorial state trellis, where each level represents a point according to a linear order of the points and possible combinations of camera resolutions covering the point are listed as states on a corresponding level; and evaluate optimal paths through the levels while obeying resolution constraints in each path that is traversed in the trellis until a survival path is determined.

According to some examples, the processor may be further configured to form transitions from one level to a next level, while following a resolution consistency for common cameras corresponding to a start and an end state of each transition; enable a transition from a non-zero resolution to a zero resolution in response to a determination that a maximum possible resolution in the next level is less than a resolution at a start of the transition; and/or enable a transition from a zero resolution to a non-zero resolution in response to a determination that a maximum possible resolution in a previous level is less than a non-zero resolution of a desired state.

According to other examples, the processor may also be configured to monitor transitions from a non-zero resolution to a zero resolution for each path in the trellis; set a variable to a predefined value when a transition from the non-zero resolution to the zero resolution occurs; and select a current branch as a branch with lowest cost that enters a current state. The processor may further define combinations of directions for multidirectional cameras as states on each branch of the trellis and perform an exhaustive search by examining all eligible combinations, computing a cost of each combination, and selecting a combination with a lowest cost.

According to yet other examples, the processor may evaluate the points and possible combinations of camera assignment to the points; upon determining one or more possible camera and resolution combinations for each point, examine a resolution consistency; omit possible camera and resolution combinations that violate the resolution consistency; and select a camera and resolution combination among remaining camera and resolution combinations. The processor may also evaluate the cameras and testing possible resolutions for each camera without examining a resolution consistency and/or set a resolution for a camera to zero in response to a determination that the camera is to be turned off of set to e resolution that fails to cover a point to which the camera is assigned. The processor may further define a total cost of each transition as a linear combination of a number of cameras and resolution costs. The cameras may include one of: a single resolution camera, a multi-resolution camera, a multidirectional camera, a multi-resolution/multidirectional camera, and a pan-tilt-zoom (PTZ) camera.

According to some examples, a method for optimal light subset selection in a lighting array that achieves a desired intensity for an area of illumination is provided. An example method may include determining a plurality of lighting intensities associated with a plurality of lights defined for intervals along a linear axis; receiving information associated with points on the intervals and desired lighting intensities for the points; forming a combinatorial state trellis, wherein each level represents a point according to a linear order of the points and possible combinations of lighting intensities covering the point are listed as states on a corresponding level; and evaluating optimal paths through the levels while obeying lighting intensity constraints in each path that is traversed in the trellis until a survival path is determined.

According to other examples, a computing device for optimal light subset selection in a lighting array that achieves a desired intensity for an area of illumination is described. The computing device may include a memory configured to store instructions and a processor. The processor may be configured to determine a plurality of lighting intensities associated with a plurality of lights defined for intervals along a linear axis; receive information associated with points on the intervals and desired lighting intensities for the points; form a combinatorial state trellis, wherein each level represents a point according to a linear order of the points and possible combinations of lighting intensities covering the point are listed as states on a corresponding level; and evaluate optimal paths through the levels while obeying lighting intensity constraints in each path that is traversed in the trellis until a survival path is determined.

According to yet other examples, a computer readable storage medium with instructions stored thereon for executing the above methods at one or more processors for optimizing an efficiency of camera placement, numbers, and resolution in a multi-camera monitoring environment may also be described.

There is little distinction left between hardware and software implementations of aspects of systems; the use of hardware or software is generally (but not always, that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of the block diagrams, flowcharts, and/or examples. Insofar as such block diagrams, flowcharts, and/or examples contain one or more functions and/or operations, it will understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combinations thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this is disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member of subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed on a computing device to optimize an efficiency of camera placement, numbers of cameras, and resolution associated with each of the cameras in a multi-camera monitoring system, the method comprising:
   determining a maximum resolution matrix,
      wherein elements of the maximum resolution matrix represent a maximum resolution with which each of the cameras are capable to monitor a distinct coverage area along a linear axis in the multi-camera monitoring system, and
      wherein the distinct coverage area is defined by a length of coverage along the linear axis in the multi-camera monitoring system;
   receiving a desired resolution vector, wherein each element of the desired resolution vector represents a desired resolution for each of the cameras in the multi-camera monitoring system;
   determining whether any of the cameras violate a resolution consistency with one or more other cameras while monitoring the distinct coverage area in the multi-camera monitoring system;
   excluding any of the cameras from the multi-camera monitoring system that violate the resolution consistency; and
   performing a discrete optimization to determine an optimal camera from the cameras with a reduced resolution error by:
      evaluating the elements of the maximum resolution matrix in view of the desired resolution vector to:
         compute a cost function to scan the coverage area for each of the cameras as a product of the desired resolution for each of the cameras and the length of coverage along the linear axis in the multi-camera monitoring system; and
         determine the optimal camera from the cameras and an optimal resolution based on the cost function, wherein the cost function includes at least a resolution error that is assigned to each of the cameras; and
      minimizing the assigned resolution error by:
         switching on a camera in response to a detection of a first resolution coverage of the cameras; and
         switching off the camera in response to a detection of a second resolution coverage of the cameras, wherein the first resolution coverage of the cameras is greater than the second resolution coverage of the cameras.

2. The method according to claim 1, further comprising:
   evaluating the elements of the maximum resolution matrix in view of a weighting parameter for the cost function.

3. The method according to claim 2, further comprising:
   linearly combining a number of a cost of the cameras and a resolution cost error with the weighting parameter to determine a total cost.

4. The method according to claim 3, further comprising:
   minimizing the total cost to determine the optimal camera and the optimal resolution for each point in the multi-camera monitoring system.

5. A computing device operable to optimize an efficiency of camera placement, numbers of cameras, and a resolution associated with each of the cameras in a multi-camera monitoring system, the computing device comprising:
   a memory configured to store instructions;
   an input device configured to receive a desired resolution vector, wherein elements of the desired resolution vector represent a desired resolution for each of the cameras in the multi-camera monitoring system; and
   a processor configured to:
      determine a maximum resolution matrix,
         wherein each element of the maximum resolution matrix represents a maximum resolution with which each of the cameras are capable to monitor a distinct coverage area along a linear axis in the multi-camera monitoring system, and
         wherein the distinct coverage area is defined by a length of coverage along the linear axis in the multi-camera monitoring system;
      determine whether any of the cameras violate a resolution consistency with one or more other cameras while monitoring the distinct coverage area in the multi-camera monitoring system;
      exclude any of the cameras from the multi-camera monitoring system that violate the resolution consistency; and
      perform a discrete optimization to determine an optimal camera from the cameras with a reduced resolution error by a process to:
         evaluate the elements of the maximum resolution matrix in view of the desired resolution vector to:
            compute a cost function to scan the coverage area for each of the cameras as a product of the desired resolution for each of the cameras and the length of coverage along the linear axis in the multi-camera monitoring system; and
            determine the optimal camera from the cameras and an optimal resolution based on the cost function, wherein the cost function includes at least a resolution error that is assigned to each of the cameras; and
         minimize the assigned resolution error by a process to:
            switch on a camera in response to a detection of a first resolution coverage of the cameras; and
            switch off the camera in response to a detection of a second resolution coverage of the cameras, wherein the first resolution coverage of the cameras is greater than the second resolution coverage of the cameras.

6. The computing device according to claim 5, wherein the processor is further configured to:
   employ a greedy technique to minimize a total cost iteratively.

7. The computing device according to claim 6, wherein the processor is further configured to:
  select another camera from the cameras and assign another resolution to the other camera from the cameras such that the other camera and the other resolution impose a largest reduction on the total cost at each iteration; and
  continue the iterations until no other camera from the cameras or resolution selection decreases the cost function.

8. The computing device according to claim 5, wherein each resolution represents a level of zoom.

9. The method of claim 1, further comprising:
  employing a greedy technique to minimize a total cost iteratively;
  selecting another camera from the cameras and assigning another resolution to the other camera from the cameras such that the other camera and the other resolution impose a largest reduction on the total cost at each iteration; and
  continuing the iterations until no other camera or resolution selection decreases his cost function.

10. The method of claim 1, wherein each of the cameras includes one of: a single resolution camera, a multi-resolution camera, a multidirectional camera, a multi-resolution/multidirectional camera, and a pan-tilt-zoom (PTZ) camera.

11. The computing device of claim 5, wherein the processor is further configured to:
  evaluate the elements of the maximum resolution matrix in view of a weighting parameter for the cost function; and
  linearly combine a number of a cost of each of the cameras and a resolution cost error with the weighting parameter to determine a total cost.

12. The computing device of claim 11, wherein the processor is further configured to:
  minimize the total cost to determine the optimal camera and the optimal resolution for each point in the multi-camera monitoring system.

* * * * *

UNITED STATES PATENT AND TRADEMARK OFFICE
CERTIFICATE OF CORRECTION

| | |
|---|---|
| PATENT NO. | : 9,591,272 B2 |
| APPLICATION NO. | : 14/115093 |
| DATED | : March 7, 2017 |
| INVENTOR(S) | : Shirani et al. |

It is certified that error appears in the above-identified patent and that said Letters Patent is hereby corrected as shown below:

In the Specification

In Column 1, Line 8, delete "§371" and insert -- § 371 --, therefor.

In Column 1, Line 10, delete "§365" and insert -- § 365 --, therefor.

In Column 1, Lines 17-24, delete:
"BACKGROUND
This application claims priority to U.S. Provisional Application Ser. No. 61/618,925 filed on Apr. 2, 2012. The provisional application is hereby incorporated by reference in its entirety. Unless otherwise indicated herein, the materials described in this section are not prior art to the claims in this application and are not admitted to be prior art by inclusion in this section."

And insert:
-- BACKGROUND
Unless otherwise indicated herein, the materials described in this section are not prior art to the claims in this application and are not admitted to be prior art by inclusion in this section. --, therefor.

In Column 1, Line 30, delete "resolution on" and insert -- resolutions on --, therefor.

In Column 2, Line 67, delete "and processor." and insert -- and a processor. --, therefor.

In Column 3, Line 19, delete "be an any" and insert -- be in any --, therefor.

In Column 3, Line 27, delete "The be foregoing" and insert -- The foregoing --, therefor.

In Column 3, Line 28, delete "apparent From" and insert -- apparent from --, therefor.

Signed and Sealed this
Twenty-third Day of May, 2017

Michelle K. Lee
*Director of the United States Patent and Trademark Office*

CERTIFICATE OF CORRECTION (continued)
U.S. Pat. No. 9,591,272 B2

In Column 3, Line 62, delete "states trellis" and insert -- state trellis --, therefor.

In Column 4, Line 5, delete "with a" and insert -- with at --, therefor.

In Column 4, Line 43, delete "tow-dimensional" and insert -- two-dimensional --, therefor.

In Column 4, Line 44, delete "multi-resolutions" and insert -- multi-resolution --, therefor.

In Column 4, Line 59, delete "100, monitoring/surveillance" and insert -- 100, a monitoring/surveillance --, therefor.

In Column 5, Line 3, delete "and coverage" and insert -- and a coverage --, therefor.

In Column 5, Line 17, delete "vector A," and insert -- vector X, --, therefor.

In Column 5, Line 37, delete "first, V" and insert -- first. V --, therefor.

In Column 6, Line 7, delete "another Part." and insert -- another part. --, therefor.

In Column 6, Line 32, delete "NOC. IF" and insert -- NOC. If --, therefor.

In Column 6, Lines 64-65, delete "provide. Acceptable" and insert -- provide acceptable --, therefor.

In Column 7, Line 51, delete "a diagram" and insert -- the diagram --, therefor.

In Column 7, Line 53, delete "that people" and insert -- that the people --, therefor.

In Column 7, Line 57, delete "coverage are" and insert -- coverage area --, therefor.

In Column 8, Line 23, delete "a diagram" and insert -- A diagram --, therefor.

In Column 9, Line 25, delete "of single" and insert -- of a single --, therefor.

In Column 9, Line 28, delete "configurations" and insert -- configuration --, therefor.

In Column 9, Line 40, delete "camera C2" and insert -- cameras C2 --, therefor.

In Column 10, Line 15, delete "with a least" and insert -- with at least --, therefor.

In Column 10, Line 23, delete "lines up" and insert -- lined up --, therefor.

In Column 10, Line 28, delete "and low" and insert -- and a low --, therefor.

In Column 10, Line 46, delete "two generators" and insert -- two state generators --, therefor.

CERTIFICATE OF CORRECTION (continued)
U.S. Pat. No. 9,591,272 B2

In Column 10, Line 49, delete "column for the" and insert -- column of the --, therefor.

In Column 10, Line 51, delete "able receive" and insert -- also receive --, therefor.

In Column 10, Line 59, delete "computes that" and insert -- computes the --, therefor.

In Column 10, Lines 63-64, delete "First, approach" and insert -- First approach --, therefor.

In Column 11, Line 11, delete "once an" and insert -- once and --, therefor.

In Column 11, Line 48, delete "allow transition" and insert -- allow a transition --, therefor.

In Column 12, Line 14, delete "that non-zero" and insert -- that a non-zero --, therefor.

In Column 12, Line 17, delete "and variable" and insert -- and a variable --, therefor.

In Column 12, Line 61, delete "that states" and insert -- the states --, therefor.

In Column 13, Line 9, delete "states to two" and insert -- states of two --, therefor.

In Column 13, Line 14, delete "to mange" and insert -- to manage --, therefor.

In Column 13, Line 28, delete "configurations," and insert -- configuration, --, therefor.

In Column 13, Line 29, delete "be any" and insert -- be of any --, therefor.

In Column 14, Line 45, delete "media communication" and insert -- media. Communication --, therefor.

In Column 14, Line 60, delete "or Specialized" and insert -- or specialized --, therefor.

In Column 15, Line 19, delete "more blocks" and insert -- more of blocks --, therefor.

In Column 15, Line 28, delete "V. EACH" and insert -- V, EACH --, therefor.

In Column 15, Line 34, delete "1124, "RECEIVED" and insert -- 1124, "RECEIVE --, therefor.

In Column 15, Line 65, delete "illustrates block" and insert -- illustrates a block --, therefor.

In Column 16, Line 49, delete "v represents" and insert -- V represents --, therefor.

In Column 17, Line 17, delete "and pan-tilt-zoom" and insert -- and a pan-tilt-zoom --, therefor.

In Column 17, Line 18, delete "example." and insert -- examples. --, therefor.

CERTIFICATE OF CORRECTION (continued)
U.S. Pat. No. 9,591,272 B2

In Column 17, Line 29, delete "is a capable" and insert -- is capable --, therefor.

In Column 17, Line 49, delete "cost as each" and insert -- cost at each --, therefor.

In Column 17, Line 55, delete "of s desired" and insert -- of a desired --, therefor.

In Column 17, Line 66, delete "point on" and insert -- points on --, therefor.

In Column 18, Line 20, delete "example," and insert -- examples, --, therefor.

In Column 20, Lines 32-33, delete "use of the block" and insert -- use of block --, therefor.

In Column 20, Line 35, delete "will understood" and insert -- will be understood --, therefor.

In Column 20, Line 53, delete "combinations" and insert -- combination --, therefor.

In Column 21, Line 3, delete "this is disclosure" and insert -- this disclosure --, therefor.

In Column 21, Line 17, delete "as floppy" and insert -- as a floppy --, therefor.

In Column 21, Line 28, delete "systems That" and insert -- systems. That --, therefor.

In Column 22, Line 43, delete "one A," and insert -- one of A, --, therefor.

In Column 22, Line 57, delete "member of" and insert -- member or --, therefor.

In the Claims

In Column 26, Line 2, in Claim 9, delete "his cost" and insert -- the cost --, therefor.